United States Patent
Eliscu

(10) Patent No.: US 11,468,410 B2
(45) Date of Patent: Oct. 11, 2022

(54) UNIVERSAL PAYMENT MODULE AND SYSTEM

(71) Applicant: Viewpost, LLC, Maitland, FL (US)

(72) Inventor: Max Eliscu, Winter Park, FL (US)

(73) Assignee: VIEWPOST, LLC., Maitland, FL (US)

( * ) Notice: Subject to any disclaimer, the term of this patent is extended or adjusted under 35 U.S.C. 154(b) by 0 days.

(21) Appl. No.: 14/313,560

(22) Filed: Jun. 24, 2014

(65) Prior Publication Data

US 2014/0310177 A1 Oct. 16, 2014

Related U.S. Application Data

(63) Continuation-in-part of application No. 14/152,852, filed on Jan. 10, 2014, now abandoned, which is a
(Continued)

(51) Int. Cl.
*G06Q 40/00* (2012.01)
*G06Q 20/04* (2012.01)
(Continued)

(52) U.S. Cl.
CPC ....... *G06Q 20/0425* (2013.01); *G06Q 20/023* (2013.01); *G06Q 20/042* (2013.01);
(Continued)

(58) Field of Classification Search
CPC ............ G06Q 20/0425; G06Q 20/023; G06Q 20/042; G06Q 20/102; G06Q 20/14;
(Continued)

(56) References Cited

U.S. PATENT DOCUMENTS

| 6,115,690 A | 9/2000 | Wong |
| 7,113,925 B2 | 9/2006 | Waserstein et al. |

(Continued)

FOREIGN PATENT DOCUMENTS

| WO | WO-96/24997 | 8/1996 |
| WO | WO-01/50307 | 7/2001 |
| WO | WO-2009/045998 A1 | 4/2009 |

OTHER PUBLICATIONS

Final Office Action on U.S. Appl. No. 13/592,847, dated Mar. 26, 2013.
(Continued)

*Primary Examiner* — Kenneth Bartley
(74) *Attorney, Agent, or Firm* — Foley & Lardner LLP

(57) ABSTRACT

Methods, systems and instructions stored on computer-readable media for receiving an invoice associated with a buyer from a vendor that includes an invoice amount. The invoice is sent to the buyer. A buyer financial institution and a buyer account are determined. A check is received from the buyer to pay the invoice. A vendor financial institution and a vendor account is determined. A custodian financial institution and a custodian account is determined. An ICL is created based in part on the received check. The ICL includes the buyer account, the buyer financial institution, the custodian account, and the payment amount to transfer into the vendor account. The ICL is sent to the custodian financial institution to transfer the payment amount from the buyer account into the custodian account. An ACH transfer of funds in the amount of the payment amount from the custodian account to the vendor account is initiated.

14 Claims, 18 Drawing Sheets

Related U.S. Application Data continuation-in-part of application No. 13/546,699, filed on Jul. 11, 2012, now Pat. No. 8,762,271.

(51) Int. Cl.
    *G06Q 20/40* (2012.01)
    *G06Q 20/02* (2012.01)
    *G06Q 20/14* (2012.01)
    *G06Q 20/10* (2012.01)

(52) U.S. Cl.
    CPC .......... *G06Q 20/102* (2013.01); *G06Q 20/14* (2013.01); *G06Q 20/40* (2013.01)

(58) Field of Classification Search
CPC ........ G06Q 20/40; G06Q 40/00; G06Q 20/04; G06Q 20/02; G06Q 20/10
See application file for complete search history.

(56) References Cited

U.S. PATENT DOCUMENTS

| | | | |
|---|---|---|---|
| 7,386,511 B2 * | 6/2008 | Buchanan | G06Q 20/042 |
| | | | 235/379 |
| 7,539,646 B2 | 5/2009 | Gilder et al. | |
| 7,548,881 B2 | 6/2009 | Narayan et al. | |
| 7,644,037 B1 | 1/2010 | Ostrovsky | |
| 7,885,451 B1 | 2/2011 | Walls et al. | |
| 7,904,354 B2 | 3/2011 | Pepe et al. | |
| 8,126,809 B2 | 2/2012 | Buchanan et al. | |
| 8,165,381 B1 | 4/2012 | Ferris et al. | |
| 8,577,797 B1 | 11/2013 | Schuette et al. | |
| 8,583,546 B1 | 11/2013 | Schuette et al. | |
| 8,768,840 B2 * | 7/2014 | Bozeman | G06Q 20/04 |
| | | | 705/44 |
| 2002/0055907 A1 | 5/2002 | Pater et al. | |
| 2003/0037002 A1 | 2/2003 | Higgins et al. | |
| 2003/0074315 A1 | 4/2003 | Lam | |
| 2003/0115155 A1 | 6/2003 | Doran | |
| 2003/0233321 A1 | 12/2003 | Scolini et al. | |
| 2004/0117305 A1 | 6/2004 | Meier et al. | |
| 2004/0133516 A1 | 7/2004 | Buchanan et al. | |
| 2004/0172360 A1 | 9/2004 | Mabrey et al. | |
| 2005/0108153 A1 | 5/2005 | Thomas et al. | |
| 2005/0131780 A1 | 6/2005 | Princen | |
| 2005/0283437 A1 | 12/2005 | McRae et al. | |
| 2006/0095374 A1 | 5/2006 | Lo et al. | |
| 2006/0212391 A1 | 9/2006 | Norman et al. | |
| 2006/0237526 A1 | 10/2006 | Mueller et al. | |
| 2006/0277129 A1 | 12/2006 | Johnston et al. | |
| 2007/0276674 A1 | 11/2007 | Hemmat | |
| 2007/0288382 A1 | 12/2007 | Narayanan et al. | |
| 2008/0027853 A1 | 1/2008 | Neubert | |
| 2008/0097899 A1 | 4/2008 | Jackson et al. | |
| 2008/0201254 A1 | 8/2008 | Sharma et al. | |
| 2008/0247629 A1 | 10/2008 | Gilder et al. | |
| 2008/0262953 A1 | 10/2008 | Anderson et al. | |
| 2008/0262954 A1 | 10/2008 | Nally | |
| 2008/0270293 A1 | 10/2008 | Fortune et al. | |
| 2008/0275774 A1 | 11/2008 | Pepe et al. | |
| 2008/0294508 A1 | 11/2008 | Alan | |
| 2009/0018889 A1 | 1/2009 | Petersen et al. | |
| 2009/0094148 A1 | 4/2009 | Gilder et al. | |
| 2009/0187482 A1 | 7/2009 | Blount et al. | |
| 2009/0292641 A1 | 11/2009 | Weiss | |
| 2010/0082443 A1 | 4/2010 | Folk et al. | |
| 2010/0161466 A1 | 6/2010 | Gilder | |
| 2010/0262522 A1 | 10/2010 | Anderson et al. | |
| 2010/0274729 A1 | 10/2010 | Holm et al. | |
| 2010/0281300 A1 | 11/2010 | Richardson et al. | |
| 2010/0293066 A1 | 11/2010 | Kimi et al. | |
| 2010/0318369 A1 | 12/2010 | Nambiar et al. | |
| 2010/0332391 A1 | 12/2010 | Khan | |
| 2011/0015974 A1 | 1/2011 | Zafrir | |
| 2011/0112967 A1 | 5/2011 | Anderson et al. | |
| 2011/0231295 A1 | 9/2011 | McMonagle et al. | |
| 2011/0251965 A1 | 10/2011 | Holm et al. | |
| 2011/0270749 A1 | 11/2011 | Bennett et al. | |
| 2011/0313920 A1 | 12/2011 | Trickel | |
| 2012/0030115 A1 | 2/2012 | Peace et al. | |
| 2012/0036065 A1 | 2/2012 | Orttung et al. | |
| 2012/0130899 A1 | 5/2012 | McMonagle et al. | |
| 2012/0158558 A1 | 6/2012 | Hahn-Carlson et al. | |
| 2012/0197675 A1 | 8/2012 | Waldron et al. | |
| 2012/0223134 A1 | 9/2012 | Smith et al. | |
| 2012/0259716 A1 | 10/2012 | Rosenberger | |
| 2013/0066777 A1 | 3/2013 | Richards | |
| 2013/0097076 A1 | 4/2013 | Love | |
| 2013/0117183 A1 | 5/2013 | Bozeman | |
| 2013/0212008 A1 | 8/2013 | Edwards et al. | |
| 2014/0012813 A1 | 1/2014 | Oh et al. | |

OTHER PUBLICATIONS

Final Office Action on U.S. Appl. No. 13/647,117, dated Jan. 7, 2014.
Final Rejection on U.S. Appl. No. 13/546,769, dated May 3, 2013.
Final Rejection on U.S. Appl. No. 13/647,117, dated May 13, 2013.
Non-Final Office Action on U.S. Appl. No. 13/546,743, dated Dec. 18, 2012.
Non-Final Office Action on U.S. Appl. No. 13/546,769, dated Nov. 26, 2013.
Non-Final Office Action on U.S. Appl. No. 13/546,769, dated Dec. 12, 2012.
Robertson, David, "Credit where credit's due," Engineering Village, Jul./Aug. 2005, pp. 58-59.
Tan Xue and Zhang Hongmin, "The Mechanism Design for Credit Sales Risk Management of the Enterprise," 2010 IEEE Conference on Management and Service Science (MASS), Harbin University of Commerce, Harbin, China, Aug. 24, 2010, 3 pages.
Non-Final Office Action on U.S. Appl. No. 14/161,303, dated Oct. 17, 2014.
Non-Final Office Action on U.S. Appl. No. 13/546,743, dated Mar. 12, 2015.
Final Office Action on U.S. Appl. No. 14/161,303, dated Jun. 25, 2015.
Non-Final Office Action on U.S. Appl. No. 14/161,303, dated Apr. 23, 2015.
USPTO Final Office Action issued in U.S. Appl. No. 13/546,743 dated Dec. 18, 2015; 19 pages.
Non-Final Office Action on U.S. Appl. No. 13/546,769, dated Oct. 20, 2015; 15 pages.
USPTO Final Office action issued in U.S. Appl. No. 13/546,769 dated Jul. 15, 2016; 22 pages.
USPTO Non-final Office Action issued in U.S. Appl. No. 14/161,299 dated Jul. 25, 2016.
USPTO Non-final Office Action issued in U.S. Appl. No. 14/161,303 dated Aug. 8, 2016.
USPTO Final Office Action issued in U.S. Appl. No. 14/161,303 dated Feb. 13, 2017.
Ahluwalia et al.; "Target-Based Database Synchronization"; University of Maryland Baltimore County; pp. 1643-1647 (Mar. 2010).
USPTO Advisory Action issued in U.S. Appl. No. 13/546,769 dated Nov. 9, 2016.
USPTO Non-final Office Action issued in U.S. Appl. No. 13/546,743 dated Jan. 12, 2017.
USPTO Non-final Office Action issued in U.S. Appl. No. 13/546,769 dated Dec. 28, 2016.
USPTO Non-final Office Action issued in U.S. Appl. No. 14/161,299 dated Nov. 3, 2016.
Final Office Action for U.S. Appl. No. 13/543,769 dated Jun. 20, 2017. 28 pages.
Non-Final Office Action for U.S. Appl. No. 13/546,769 dated Jan. 19, 2018, 29 pages.
Non-Final Office Action for U.S. Appl. No. 14/161,299 dated Dec. 8, 2017, 18 pages.
Final Office Action for U.S. Appl. No. 13/546,743 dated Jul. 27, 2017, 38 pages.

(56) References Cited

OTHER PUBLICATIONS

Non-Final Office Action for U.S. Appl. No. 14/161,303 dated Oct. 16, 2017, 12 pages.
Final Office Action issued in U.S. Appl. No. 14/161,303 dated Jun. 4, 2018, 18 pages.
Final Office Action issued in U.S. Appl. No. 14/161,299 dated Jun. 12, 2018, 31 pages.
Non-Final Office Action issued in U.S. Appl. No. 13/546,743 dated Jun. 28, 2018, 70 pages.
Final Office Action on U.S. Appl. No. 14/161,299 dated Jun. 8, 2020.

* cited by examiner

| Invoice # | Status | Amount | Age | Early Request Amount | Discount | Acceptance Prediction | |
|---|---|---|---|---|---|---|---|
| 1006 | Approved | $1500.00 | 10 | $1470.00 | 2.0% | 94.8% | ≤602 |
| 1007 | Approved | $3500.00 | 7 | $3419.50 | 2.3% | 63.9% | ≤604 |
| 1001 | Approved | $2000.00 | 28 | $1970.00 | 1.5% | 62.1% | ≤606 |
| 1010 | Approved | $5000.00 | 1 | $4825.00 | 3.5% | 61.3% | ≤608 |
| 1002 | Approved | $100.00 | 20 | $99.00 | 1.0% | 5.7% | ≤610 |

Total Early Payment Amount: $4,500

| Invoice # | Status | Amount | Age | Early Request Amount | Discount | Acceptance Prediction | |
|---|---|---|---|---|---|---|---|
| 1010 | Approved | $5000.00 | 1 | $4825.00 | 3.5% | 61.3% | 702 |
|  |  |  |  | $4825.00 | 3.5% | 61.3% |  |
| 1006 | Approved | $1500.00 | 10 | $1470.00 | 2.0% | 94.8% | 704 |
| 1007 | Approved | $3500.00 | 7 | $3419.50 | 2.3% | 63.9% |  |
|  |  |  |  | $4889.50 | 2.2% | 60.6% |  |
| 1007 | Approved | $3500.00 | 7 | $3419.50 | 2.3% | 63.9% | 706 |
| 1001 | Approved | $2000.00 | 28 | $1970.00 | 1.5% | 62.1% |  |
|  |  |  |  | $5389.50 | 2.0% | 39.7% |  |

UNIVERSAL PAYMENT MODULE AND SYSTEM

CROSS REFERENCE TO RELATED PATENT APPLICATION

This application is a Continuation in part of U.S. application Ser. No. 13/546,699, filed Jul. 11, 2012, herein incorporated by reference in its entirety. This application is a Continuation in part of U.S. application Ser. No. 14/152,852, filed Jan. 10, 2014, herein incorporated by reference in its entirety.

BACKGROUND

The following description is provided to assist the understanding of the reader. None of the information provided or references cited is admitted to be prior art.

In the normal course of business, a company can utilize a number of vendors to procure needed products and services. As a company can be both a buyer and a vendor, a buyer refers to a company that is purchasing goods or services, and a vendor is a company that sells goods or services. FIG. 1 is a graph 100 of a common relationship between a buyer's amount of purchases and the number of vendors used by the buyer. Some buyers spend a large amount at a small number of vendors (102). These buyers though tend to still have numerous vendors that provide smaller amounts of products and services (104).

In instances where the buyer is a very large corporation, with very substantial financial resources, and the vendors that represent the majority of purchases are also very large corporations, with very substantial financial resources, costly, complex and customized electronic supply chain order, fulfillment, invoice presentment and payment systems are sometimes implemented. Once these complex systems have been implemented, the large buyer and vendor are able to interact with one another in a nearly paperless fashion, including purchase order delivery, invoicing and payment. These systems are often referred to as closed loop environments, as the platforms are not extendable, without deep and costly integration, to all other customers or vendors. Often, these systems rely on electronic data interchange (EDI) interfaces, provided by third parties, to deliver data to one another. And, when payment is due, these systems rely on integrations with bank software platforms to deliver electronic payment via the Automated Clearing House (ACH). The deep customized integration that can exist in these highly complex and costly systems, by its very nature, requires substantial effort, often completed by third party consultants, to design and implement. And, once the system is designed, both buyer and vendor must still allocate substantial management and staff resources during the setup process. All of the above ignores completely that finding vendors and buyers, completing and responding to requests for proposals (RFPs), and "setting up vendors and customers" within each other's accounting or enterprise resource planning systems is time consuming, manual and relies heavily on the acquisition of information that can only be provided directly by the counter party. That said, once the system is complete, efficiencies still improve. In other circumstances such deep integration is simply not practical. For instance, in the retail sector, consumer tastes change so rapidly that many purchases from vendors must be managed on a moment-by-moment basis. Notwithstanding, large buyers with substantial financial resources still work very hard to eke out as much efficiency from the procurement process as possible, often at the expense of their much smaller vendors, who are forced to comply with the variant invoicing requirements and standards imposed upon them by their large customers. And even then these systems are generally designed for vendors that supply valuable inventory, and are not implemented with small infrequently used vendors supplying items that would generally be classified as general and administrative expense items.

In many cases, these large buyers eschew deep integration and simply require their vendors to communicate with them concerning transactional information via Electronic Data Interchange. In these cases, the vendor is generally required to hire a third party integrator to serve as an intermediary to enable them to receive each of their customers' electronic orders and comply with each of their customers' unique invoicing requirements. The introduction of a third party integrator is an expensive necessity for vendors who choose to do business with these customers. It should be noted that it is highly unusual that all of a vendor's customers require EDI integration, and as a result, vendors are required to maintain many disparate processes to support and manage their many customer relationships. Some customers receive invoices via EDI, some via paper, others via email. Managing the funds owed by their customers is equally inefficient for small and large vendors alike.

In rare circumstances, large buyers with substantial financial resources have gone to the trouble and expense of developing, or purchasing, Electronic Invoice Presentment and Payment ("EIPP") solutions to communicate invoice and payment status to vendors. However, this remains rare, and even where it exists, the invoice and payment information is buyer specific. That is to say, when vendors sell to buyers that have a platform that provides invoice and payment information, each system is unique and independent, a closed loop. And even then, there is no standardization within these platforms (the information available is different, both in terms of its type, presentation, access, etc.), and as a result, even in the rare circumstances where an online system is available, the acquisition of invoice and payment status across customers is time consuming and inefficient. In most cases, no data is available online and vendors must call each of their customers on the phone, or email them, to obtain invoice and payment information, necessitating customer response to these calls and emails.

All of the above consume substantial time and effort for both the buyer and vendor.

Electronic invoice and presentment solutions are generally designed to meaningfully improve the efficiency of a large buyer with a large number of disparate vendors. This improvement is accomplished in numerous ways, but heavily focuses on the elimination of paper handling, data entry, and manual invoice approval among accounts payable departments. The solutions are, by design, buyer-centric. The buyer receives increased efficiency at the expense of the vendor, who must comply with specific invoice requirements mandated by the buyer. This arrangement often means that the vendor must submit invoices to the buyer following very precise business rules that often force vendors to ignore the invoice printing and email functions that exist within their accounting software platforms, instead submitting invoice information to various customers using unique buyer-specific one off processes. While electronic invoice presentment and payment systems can integrate into a buyer's accounting system, they rarely integrate with similar efficiency into the systems of their vendors, and then, only within custom designed and highly complex systems available only to the largest vendors with substantial financial resources. Even then, the integration is unique to the specific buyer-vendor relationship, rather than to all buyers, and conversely, all vendors. In the rare cases where a customer has made an online invoice status system uniquely available to the vendor, if a vendor needed to request the modification of an invoice after delivery to their buyer, the vendor would need to make the change within their own accounting system, and then resubmit the corrected invoice, or credit memo, to their customer, in a duplicative process.

Smaller vendors with fewer financial resources, or that sell small quantities of goods or services, particularly on an infrequent basis, or larger vendors with substantial financial resources that sell a small amount of product to their customers, simply have too little capital, sophistication, or financial incentive to undertake such integration projects or implement an EDI relationship. In these circumstances, relationships generally involve the production and mailing of a large number of paper invoices, manual buyer approvals, data entry, collection phone calls and, ultimately, payments by check.

SUMMARY

In general, one aspect of the subject matter described in this specification can be embodied in methods for receiving an invoice associated with a buyer from a vendor that includes terms negotiated between the buyer and the vendor including an invoice amount. The invoice is sent to the buyer. A buyer financial institution and a buyer account associated with the buyer are determined. The vendor is not required to know the buyer financial institution and the buyer account. A check is received from the buyer to pay the invoice. The check includes a payment amount and a payee that is the vendor. A vendor financial institution and a vendor account associated with the vendor is determined. A custodian financial institution and a custodian account is determined. An image cash letter (ICL) is created based in part on the received check. The image cash letter includes the buyer account, the buyer financial institution, the custodian account, and the payment amount to transfer into the vendor account. The image cash letter is sent to the custodian financial institution to transfer the payment amount from the buyer account at the buyer financial institution into the custodian account. An automated clearing house (ACH) transfer of funds in the amount of the payment amount from the custodian account to the vendor account is initiated. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 6 illustrates a listing of invoices that are available for early payment in accordance with an illustrative implementation.

FIG. 7 illustrates an ordered list of invoices for early payment in accordance with an illustrative implementation.

FIGS. 10-16 are screenshots of a user interface in accordance with an illustrative implementation.

Like reference numbers and designations in the various drawings indicate like elements.

DETAILED DESCRIPTION

Figure 1:
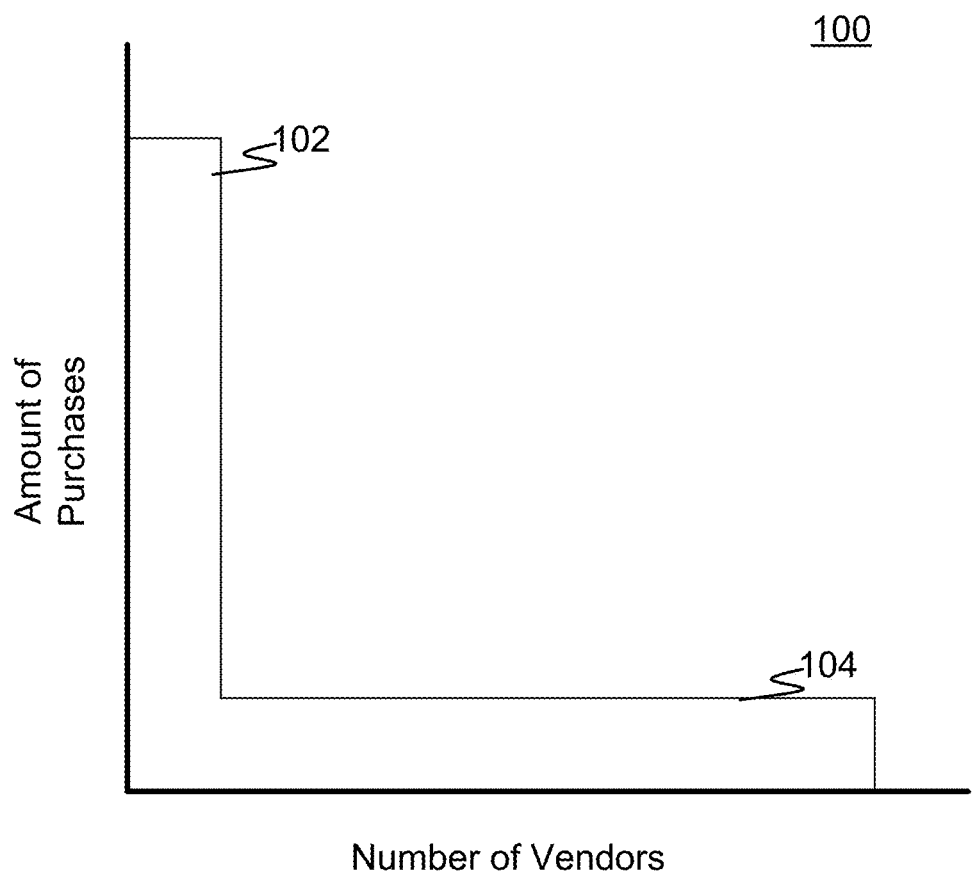
FIG. 1 is a graph of a common relationship between a buyer's amount of purchases and the number of vendors used by the buyer.
Figure 2:
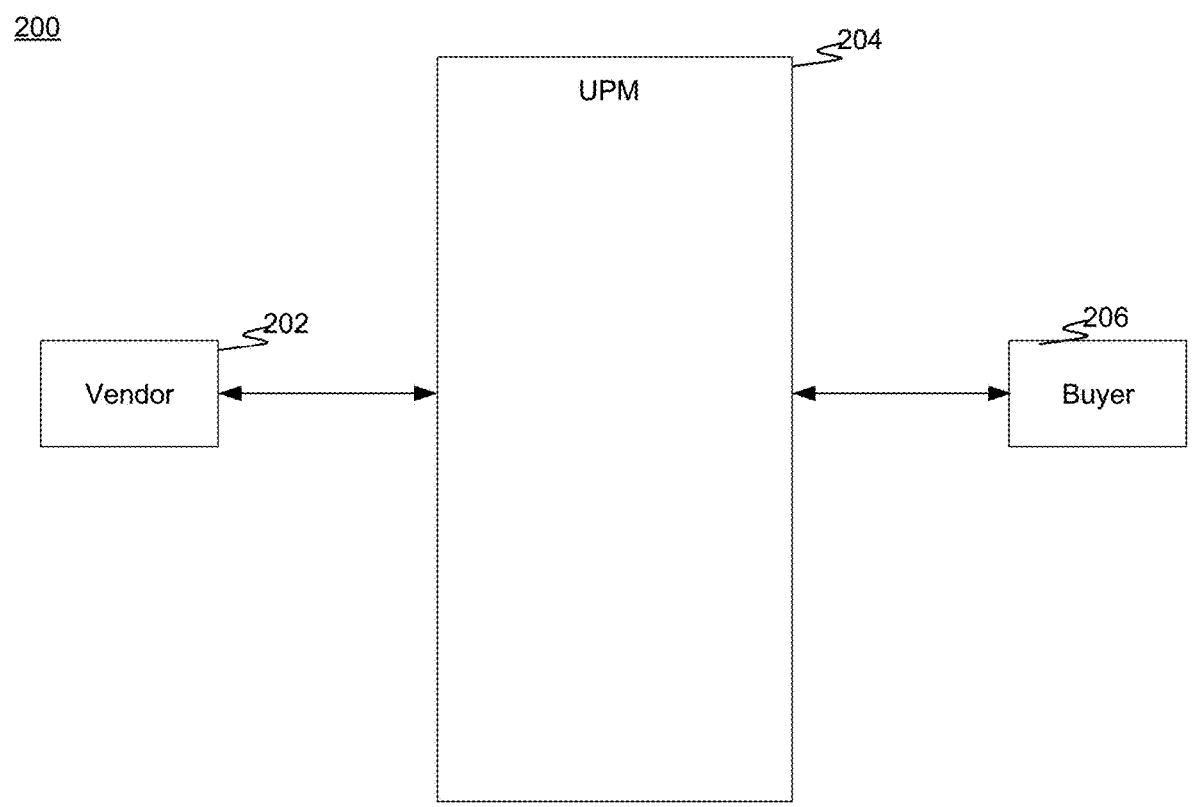
FIG. 2 is a block diagram of an accounting system in accordance with an illustrative implementation.

A system utilizing a universal payment module (UPM) can extend the benefits of a specialized electronic invoicing system to all vendors, and all buyers, regardless of size or accounting system used by the vendor. FIG. 2 is a block diagram of an accounting system in accordance with an illustrative implementation of such a system. A vendor 202 and a buyer 206 can interact with one another using a universal payment module (UPM) 204. As a vendor is a business entity that likely purchases products and services, a vendor can also be a buyer and vice versa. The UPM 204 is configured to interface with the accounting system of the vendor 202 and also the accounting system of the buyer 206. In addition, the UPM 204 can facilitate the deposit of funds into the accounts of the vendor 202 and/or the buyer 206 at financial institutions. In one implementation, the buyer 206 can authorize payment of a vendor's invoice using the UPM 204. Based on the payment authorization, the UPM 204 can provide information regarding an invoice to a customer along with the account or accounts at one or more financial institutions from which the buyer can pay the invoice. In one implementation, an indication of the financial institution and account associated with the buyer can be provided to the buyer. In another implementation, a buyer's default financial institution and account can be used and no indication needs to be provided to the buyer. The customer can then create a check based upon this data and send the check to the UPM 204. This check creation is preferably done electronically. After receiving the check via an electronic communication, the UPM 204 can facilitate the deposit of funds into the appropriate vendor's account in numerous ways. In one implementation, the UPM 204 can print the check on behalf of the buyer. The printed check can be sent to the vendor or be used to create an image cash letter (ICL) for transmission to the vendor's financial institution. The ICL can be created to comply with various laws and regulations, e.g., Check 21, UCC, etc. Regardless of whether the check is printed, the UPM 204 can facilitate the deposit of the check into a vendor's account. Typically, a deposit via ICL requires financial institutions to set up ICL services for each account. The setup procedure can require credit approval, technological sophistication, equipment such as scanners, test file submission and confirmation, substantial legal documentation, etc. Traditionally, the account set-up process is entirely manual, can take several weeks post approval, and costs thousands of dollars. This process can be long and painful and can require technology integration with numerous test files and confirmations flowing back and forth to confirm data integrity and consistency. Accordingly, it is in neither the financial institution's or small customer's interest to deposit payments via ICL, and yet, depositing funds at financial institution branch locations remains exceedingly inefficient for both financial institution customers and for financial institutions. A system using the UPM 204 can resolve these issues. Financial institutions that interface with a system using the UPM 204 can authorize the UPM to submit ICL files which aggregate deposits in separate or comingled image cash letters within the ICL file, for the benefit of their customers. In addition, as necessary, vendors connected to a UPM-enabled system may also delegate authority to the system. A system with the UPM, thus, serves as an aggregator of payments for connected vendors. In so doing, the UPM-enabled system creates tremendous efficiency for the financial institution and for the vendors, as the financial institution may now enable the electronic deposit for all its customers without having to set up any of its customers for ICL deposit services. Rather, it approves and confirms the UPM-enabled system's ability to submit acceptable ICL files, and to remain compliant with a financial institution's requirements, and through the UPM, all customers can now enable electronic deposit.

Vendors can opt into ICL deposits through the UPM 204. If a vendor has opted into ICL deposits through the UPM 204, the UPM 204 can electronically initiate the deposit of the buyer's check payment into the vendor's account. In this example, the buyer is not required to know any of the vendor's financial account information, and therefore, the UPM 204 does not make this information available to the buyer. The UPM 204, however, knows the vendor's financial account information and can use this information to initiate the deposit. Accordingly, the vendor's financial account information is protected from the buyer's visibility. This arrangement is unlike solutions that rely solely on ACH payments. In ACH systems, buyers seek to obtain the bank account information of their vendors, and then buyers set up, through a cumbersome and tedious manual process, ACH payment capabilities within their financial institution's systems. Further, to the extent they want to make payments from accounts at multiple financial institutions, the same manual set up process must be duplicated. Unfortunately, there can be little trust among companies, hampering the acquisition by buyers of their vendors' bank account information. Further, small vendors are often thinly staffed, and the very act of a buyer getting an authorized representative of the vendor on the phone to acquire bank account information can be tedious and expensive, and is often unsuccessful. A system using the UPM 204 can help address this issue of ACH systems, since the account information of the buyer and vendor are not shared. As described in greater detail below, buyers and vendors can provide their account information one time to the a UPM-enabled system. Further, it is not necessary for the UPM-enabled system to share the account information of one user with another user to further payment of an invoice. The UPM-enabled system can, therefore, protect the account information from being distributed to parties that do not require the account information, while still facilitating payment with seamless efficiency from one user to another. As explained in greater detail below, the UPM-enabled system allows buyers and vendors to interact in various other ways. Before using the UPM-enabled system, a company must first register with the system.

Registration

A company can join the UPM-enabled system in a number of ways. For example, a previously-registered company can request that its buyers and/or vendors register with the UPM-enabled system. Using the vendor and buyer data present in the UPM-enabled system, an email containing an invitation to register can be sent to each company or a subset of companies associated with the registered company. This registration can include tokenized information within the invitation so that the registration link can identify the connection between the two companies as registration occurs, and after registration the invited company can have immediate visibility to the inviting company. Further, as to the registration process, since the UPM-enabled system includes connections to a network of companies, the UPM-enabled system is aware of the myriad relationships that can exist within and among companies and can identify circumstances, and invite companies to register, where benefit is likely. For instance, if multiple vendors connected to the UPM-enabled system all sell to the same customer, but the customer is not yet on the UPM-enabled system, the system can make the customer aware of the connections that already are known, the benefits that can exist immediately upon connection, and suggest a connection even in circumstances where the customer would not be aware of the existing connections, and thus benefits.

In one implementation, once a connection request is received, a company can begin the UPM registration process. As a previously registered company invited the company, the UPM-enabled system has data related to the invited company. This data can be used during the registration process to avoid duplicative data entry. For example, if the inviting company is already in possession of the address, phone number, fax number, doing-business-as name, etc. from having previously sold to the invitee, or the data was simply in its accounting software and was "synced" to the UPM-enabled system, the same data can be pre-populated within the registration page, limiting the amount of additional data the invitee must enter to register. The invitee has, of course, the ability to correct any incorrect data provided by the inviting company. Alternatively, an uninvited company can register with the UPM-enabled system.

After registering, a company can log into the UPM-enabled system and see any available invoice information from the inviting company. For example, in the instance where the invited company was a vendor of the company that initiated the invitation, upon registration it would be able to see the open invoices associated with the inviting company, and the invoice status thereof. In addition, once the company's data has been synchronized with the UPM-enabled system, the invited company can invite its own vendors and buyers.

In traditional systems, before a buyer can pay a vendor, or in some cases do business with a new vendor, the vendor must be "set up" in the buyer's accounting and/or ERP system. This process is generally manual and must be completed with each new relationship that either the vendor or buyer develops. Further, when any captured information changes in the future, it is incumbent on the vendor, or buyer, to notify all of their active (or inactive) vendors or buyers, of the change, a manual and inefficient process. This information can include W-9 forms and electronic payment information, enabling buyers to make electronic payment to vendors using conventional ACH functionality. In contrast, the UPM-enabled system, acting in its capacity as a network, allows any vendor to complete their typical set-up information once and store relevant information on the UPM. In so doing, all new customers connecting with the vendor over the UPM-enabled system can access and integrate all needed information within their accounting or ERP systems at the click of a button. Accounts payable and accounts receivable departments can use the UPM-enabled system to set up new vendors and customers, as the UPM-enabled system serves as the central repository for such information, across all companies. Further, any updates to this information can notify the vendor/buyer counterparties of the changes, allowing anyone to distribute updated information at the click of a button. The above is particularly important with infrequently used vendors, where the cost of set-up, in comparison to the amount of purchases, is particularly high. There remains a significant lack of trust between buyers and vendors, particularly as it relates to electronic payment information and small vendors. As a result, the UPM, can serve to safeguard the delivery of certain information, while not impeding the functionality or efficiency of relationships. For instance, the UPM can serve as the central repository for counterparty account information. In this capacity, the UPM-enabled system, through its payment capabilities (described in greater detail below) can associate the payment information with the counterparty without ever sharing the information, enabling buyers to make payment directly to the accounts of vendors without ever being provided vendor payment information.

Once registered, a company can also set up accounts. For example, a company can provide account information of one or more company accounts, e.g., bank accounts. These accounts can be used to make and/or receive payments. As explained in greater detail below, a buyer can pay an invoice from anywhere, at any time, on any device connected to the internet, whether by check or otherwise. Further, a vendor can receive the payment into any set-up account associated with the vendor, all by sharing payment information with the UPM-enabled system once rather than with each buyer, who would then come into possession of confidential account information. Accordingly, the UPM-enabled system can become a central repository of data and as described in greater detail below, allow parties to make payments without having to share payment information with other parties. In addition, as described in greater detail below, the UPM-enabled system can convert accounting data into a common form, which allows the UPM-enabled system to become a standardized source of information and facilitates the dissemination of that data to the respective parties.

In some implementations, account verification procedures can be implemented. As an example, two small payments can be made to an account. To verify the account, the exact amount of the two payments can be entered by a company. If the amounts match the amounts of the two small payments, the account is verified. Other verification methods are also available, e.g., receipt of a voided check; receipt of a deposit slip; manual verification with a bank, etc.

Accounting System Synchronization

When businesses reach a certain scale they often acquire accounting software to facilitate the production of their financial statements. There are hundreds, if not thousands, of options to choose from, and within those options, tens of thousands of versions. However, in many cases businesses opt to produce their financial statements by hand, or through the assistance of outside accounting personnel or consultants. The simple scale of options, and disparate processes within and across each, prevent businesses from easily interacting with one another in a highly efficient and automated fashion, as accounting platforms are not standardized, and even if they were, the lack of connectivity among and between them would prevent integration. The UPM-enabled system includes a connected network that is designed, among other things, to enable the easy integration and distribution of data among and between all businesses, regardless of the accounting or ERP software they have chosen, or even in circumstances where they use no accounting software at all. In some implementations, the UPM-enabled system can be used as the electronic accounting system for these small businesses. For companies that do use an electronic accounting system, the information contained within the electronic accounting system can be synchronized with the UPM-enabled system. For example, data representing vendor lists, buyer lists, receivables, payables, etc., can be integrated into the UPM-enabled system.

The accounting system synchronization can start with the company indicating the accounting system that is used by the company. Location information, such as where accounting data files, last used file, etc., are located, can be provided as needed. For example, the UPM-enabled system can determine and/or suggest a location or the user can browse and select the source location. Once the accounting system is identified, and data files located, the accounting data can be sent to the UPM-enabled system. After the accounting data is in the UPM-enabled system, the UPM data can be synchronized with the company's accounting system. As described in greater detail below, synchronization can be done in various ways. For example, synchronization can be done on express demand by the company. In another implementation, synchronization can occur automatically based upon a change in either the company's accounting system and/or the UPM. One advantage of syncing with the UPM-enabled system is that vendors are able to transmit invoice data (among other information) to all customers connected to the UPM-enabled system without any meaningful changes to the business processes already designed to uniquely maximize their internal efficiency. This feature is in contrast to circumstances where customers regularly dictate unique invoice and/or data delivery requirements to their vendors, requiring vendors to modify their business practices to accommodate these unique requirements. In many instances, these requirements can only be met by purchasing yet additional software unique to the requirements of a specific customer, and paying third party integrators to modify solutions.

In one implementation, a synchronization agent on one or more computing devices of the company can be used to send and receive data to/from the UPM-enabled system. For example, in the instance where both a buyer and vendor are connected to the UPM-enabled system, and each other on the UPM-enabled system, and both are utilizing syncing functionality, and the buyer is utilizing auto-syncing functionality (and after syncing if the buyer was not auto-syncing) to keep both its accounting system and/or ERP system in sync with the UPM-enabled system, the act of the buyer paying an invoice within its accounting or ERP system would instantaneously push payment data to the UPM that would be visible to the vendor. In addition, the UPM-enabled system would provide instantaneous notification to the devices preferred by the vendor (email, text, etc.) Upon confirmation of receipt of the payment, the vendor would need only indicate, on the UPM-enabled system, that the payment had been received, and a sync entry would be triggered, allowing the vendor to apply the payment within its accounting system without any data entry and without error. Further, since the UPM-enabled system can serve as a business process management system, in instances where a payment was received from a customer and a discrepancy existed, the vendor would be able to modify the application of the payment on the UPM-enabled system. For instance, if the customer made a payment in full, but took a credit for damages, or a perceived allowance, the vendor on the UPM-enabled system would be able to apply the "short payment" to the GL categories that existed (or create new ones that would be pushed into their accounting system) within the vendor's accounting or ERP system (same being visible on the UPM-enabled system), and upon satisfactory categorization of the payment on the UPM-enabled system, sync same down to their accounting or ERP system. All of this can be done from any internet connected device, at the click of a button, without any data entry. Using a synchronization agent allows a company to continue to use its existing accounting system while receiving the benefits of the UPM-enabled system. Thus, a company can use the UPM-enabled system without having to change internal procedures to accommodate or learn a new accounting system.

Advantageously, synchronization of accounting and ERP data with the UPM-enabled system, which serves as a network of businesses, allows each company to manage its relationships with all of its customers and vendors from the UPM-enabled system. More specifically, rather than managing fifteen different relationships with its customers using a combination of manual and integrated closed loop systems (buyer/vendor-specific), the same company would be able to manage all fifteen relationships within the UPM-enabled system, assuming the buyers were all connected to the UPM-enabled system. In one place, the vendor would be able to see the status of all open invoices from one location. Further, the vendor, who itself is likely a buyer, would also be able to manage its relationships with its vendors, and all without phone calls, data entry duplication or error, and all fully integrated. The UPM-enabled system, therefore, is far more than an invoice presentment solution used by a buyer to communicate invoice status to vendors. It is a network, or ecosystem, of fully integrated (data delivery, receipt, review, dispute, approval, payment and synchronization into disparate accounting platforms) relationships, which does not require third party integrators, expensive new platforms, new business processes across all customers and all vendors.

In one implementation, the synchronizing of data requires approval of the data that is to be synchronized. Changes to data in the UPM-enabled system and the company's accounting system can be noted, but not automatically synchronized. For example, a synchronization queue can be used to indicate the synchronizations that need to occur based upon changes to data. For example, a company can create a new invoice in the company's accounting system. The synchronization agent can send to the UPM-enabled system data that describes this new invoice. In this implementation, the UPM-enabled system does not synchronize this data with the company's accounting data on the UPM-enabled system. Rather, the UPM-enabled system indicates in the synchronization queue that the new invoice was created in the company's accounting system, has been identified by the synchronization agent and is available to be synchronized with the data in the UPM-enabled system. Data changes made to the UPM-enabled system's accounting data can also be shown in the synchronization queue. For example, a company may issue a credit memo from the UPM-enabled system to a vendor's account using the UPM's interface. This change can be shown in the synchronization queue, but will not be integrated into the customer's accounting system until the customer approved the sync, or turns on auto syncing capabilities. Nonetheless, the vendor would be made aware of the credit memo immediately upon creation by the customer. A customer can review the synchronization queue and select any of the data changes to sync. For example, a customer can select to synchronize all entries in the synchronization queue. Once selected, the selected queue entries can be synchronized between the UPM-enabled system and the company's accounting system.

In another implementation, data can automatically be synchronized as data changes in either the UPM-enabled system or the existing accounting system. In this implementation, when a change in made to any accounting data in one system, the change is sent to the other system. For example, if an invoice is changed in the existing accounting system, the change is sent and automatically synchronized with the data in the UPM-enabled system. The synchronization agent can send and receive data as described above. However, rather than needing express approval to synchronize data, the synchronization agent can sync received data with the company's existing accounting system as data is received. Similarly, the UPM-enabled system can synchronize its data when changes in the existing accounting system are received from the synchronization agent. Although not entirely eliminated in this implementation, data conflicts can be greatly reduced.

During synchronization, data conflicts can occur between various systems. For example, both a buyer and a vendor may change the same piece of data but to different values. Some changes, however, may not be material to a particular party. Because the accounting system data may have changes that are not material as far as the UPM is concerned, a hash of the fields that are material is computed, and compared to one generated from the UPM-enabled system's data to hide entries from the queue where only extraneous data has changed. The entry is still written to the UPM-enabled system, however, because the immaterial data may be required for display on an invoice or other document generated by the user. The data can be stored as a collection of name-value pairs that can be retrieved when needed. If the accounting package allows for it, the document layout itself can also be synced to and from the UPM-enabled system. A data collision can also occur between material data. For example, an amount of an invoice could be modified both in the user's accounting system, and in the UPM-enabled system, both to different amounts and both prior to the last sync (assuming auto syncing was not enabled). If both of these changes are synchronized, a data collision can occur since the same piece of data was changed to different values. The conflict can be resolved in a number of ways: the change from either the UPM-enabled system or the accounting system can automatically trump the other; the latest change can win; or the user can decide. In one implementation, the conflicting data and any associated data can be displayed and a company can expressly indicate which change should be synchronized.

As described above, the UPM-enabled system allows integration with a buyer's accounting system. Changes made in the buyer's accounting system or in the UPM-enabled system can be synchronized with one another. The UPM-enabled system, however, also allows synchronization with a vendor's accounting system. Accordingly, the UPM-enabled system integrates the entire invoicing process into the accounting systems of both the buyer and the vendor, regardless of their platform, and without the need for the purchase of third party adaptive software. In one implementation, the UPM-enabled system uses synchronization agents on both the buyer's and vendor's computing systems. The UPM-enabled system can send data to the synchronization agent in a known format, e.g., a common data format. For example, the UPM-enabled system can send data that describes a data change, e.g., in XML, field=value format, etc. The synchronization agent can then integrate the data into the existing accounting system. In another implementation, the UPM-enabled system can send the changes to the data in a format that is compatible with the existing accounting system. In this implementation, the synchronization agent can simply pass along the data for integration into the existing accounting system.

In yet another implementation, the synchronization agent can extract accounting data from a software package and convert it to a common data format for transmission across a network to the UPM. A synchronization agent can receive data from the UPM in the common data format and convert the data into a format for use by a specific accounting system. Various accounting systems can easily be supported through the synchronization agents. Because the data is transported in a common data format, data uploaded to the UPM-enabled system from one accounting package can then be downloaded into a completely different accounting package. In a typical scenario, the data synced up from one user's accounting package will be transmitted to another user, who will then have the opportunity to review it and make changes if necessary. In one implementation, once the second user approves the data, it can be synced down into their accounting package, even if it is a different version or different accounting package altogether, from that used by the first user. Often times this will occur by the data being placed into a separate outbound queue, so it can be pulled down by the synchronization agent at a future point in time, although, the process can be automated based on user preference and described in greater detail above. Similarly to how the agent can convert accounting package data to a common data format, it can also write data from the common format back to an accounting package through the same synchronization agent.

The UPM-enabled system can also provide an interface for accessing and managing data from UPM. For example, a web interface or a client program can allow data to be directly input into the UPM-enabled system. This implementation can be used by companies that do not have an electronic accounting system. Accordingly, there is no need to synchronize the data as from the company's perspective there is only a single accounting system, the UPM-enabled system. The company, however, can take full advantage of the features of the UPM-enabled system. In addition, the UPM-enabled system can provide a mobile interface such that mobile devices can easily access data contained with the UPM.

Once a buyer or vendor has synced their accounting data with the UPM, vendors or buyers can quickly and efficiently obtain a snapshot of receivables or payables. In one implementation, the UPM-enabled system allows a vendor and/or buyer to see all of their outstanding invoices, the due date of the invoices, their buyers willingness to pay invoices early, and if so, the applicable discount that would be due. This allows a vendor or buyer to easily see the current cash flow due them, as well as the total amount of funds available for acceleration. For example, vendors can use this data to determine how best to access additional liquidity and how that will impact the vendor's cash flow. As an additional example, a buyer can see all outstanding invoices that are to be paid and determine how best to pay the invoices. The various data can be presented in table format, in an image, in a graphical format, or in a calendar format.

Invoice Management

After a buyer and a vendor for a transaction are registered with the UPM-enabled system, the invoicing process can be fully electronic. Further, the features of the UPM-enabled system allow both the buyer and vendor to continue using their existing accounting system, gain the benefits similar to those of specialized electronic invoice systems, and gain features not available in the specialized electronic invoice systems. For example, in one implementation of the UPM-enabled system, a buyer can review an invoice on a computing device or mobile computing device. To the extent an error is identified the buyer can select the line item reflective of the error, entering the correct value ($15 dollars an hour, rather than $150 dollars per hour), adding a comment to explain the change, and upon completion, the UPM can immediately deliver notification to the appropriate vendor, e.g., the specific person identified to receive such notifications, given the customer, amount, etc., of the customer change/dispute. To the extent the vendor agrees with the change, the vendor can acknowledge acceptance. Upon acknowledgement, if the vendor is a user that syncs the UPM-enabled system with their accounting platform, the UPM automatically creates a Credit Memo to push to the accounting platform, through the sync process (which can be automated as described above), eliminating data entry, and ensuring an efficient resolution process. Further, the customer can be notified and the invoice value changed per the resolution, appending the invoice history to include a complete audit trail of the dispute and the resolution. In another example, a customer might receive ten boxes of glass tumblers. If one box was damaged and all items within the box broken, the customer could take a picture of the damaged box on their phone, select the line item on the invoice representing the ten boxes, edit the line to reflect nine boxes, transfer the photo from their phone to the line item, possibly adding a comment, and upon completion, notification can be sent to the vendor, and the UPM-enabled system can be updated to reflect same. In another instance, where the changes described above took place on the UPM rather than a mobile device, the photo could be attached to the line item. If the damage was discovered after the invoice had been synced to the buyer's accounting platform, notification would still be sent to the vendor, but upon acceptance by the vendor, since the UPM would have knowledge that the invoice had already been synced to the customer's accounting platform, the credit memo that was generated by the UPM-enabled system for syncing to the vendor's accounting platform would also be delivered, via the UPM, to the buyer, for syncing into their accounting platform. The process can go back and forth if the vendor does not agree with the buyer.

The UPM-enabled system can also be used to provide accounting data in a form and/or format based upon a buyer or vendor's invoice, receipt, approval, payment, etc., processes without requiring the corresponding buyer or vendor to understand and expressly comply with the processes. For example, buyers often establish unique invoice, receipt, approval and payment processes the effectiveness of which are based on the standardization of vendor invoices, or at a minimum, ensuring that vendors submit invoices with minimum required data and fields. In other instances, buyers expressly attempt to minimize the fields that appear on vendor invoices, minimizing accounts payable review timelines. Buyers typically produce operational manuals to help vendors understand these requirements. Practically, buyers have little ability to control the billing practices of their vendors, particularly their small and infrequent vendors. As a result, they often receive invoices that are inconsistent with their requirements. To encourage compliance buyers sometimes charge vendors penalties for sending invoices that are inconsistent with their requirements. Another common strategy is to simply refuse to process nonconforming invoices. Unfortunately, this common problem, and its unfortunate consequences, causes everyone to lose.

In one implementation of the UPM-enabled system, buyers are able to establish universal invoice acceptance criteria. For example, a buyer can indicate the fields that are required to be on an invoice. The buyer can also indicate what fields are not needed and should not be part of the invoice sent to the buyer. When the UPM-enabled system receives invoice data from a vendor for the buyer, the UPM can ensure that the data requested by the buyer is contained in the data received from the vendor. If any data is missing, the UPM can inform the vendor to provide additional information. As part of this process, the UPM can format data received from a vendor and ensure that the data matches the criteria provided by the buyer. Accordingly, the UPM-enabled system can ensure that the buyer receives the desired data and remove any data provided by the vendor but not needed by the buyer.

Alternatively, buyers can establish standards for different types of purchasing. For instance, inventory purchases might be required to be accompanied by a purchase order number while transportation invoices by a proof of delivery or PRO number. These standards can then be used by the UPM-enabled system to ensure a vendor's compliance, nearly eliminating the need for vendor training. For instance, the UPM, during the sync process, as described in greater detail below, is able to identify the fields being sent by the vendor and can ensure that all required fields are present. To the extent the UPM-enabled system identifies an invoice without required data, the invoice can be identified as missing required fields, as presented in the sync queue, as described in greater detail below. In the case of a missing data element the vendor can be made aware, prior to delivery of their invoices, that the invoices are deficient and cannot be delivered. The vendor can then append the invoice from within the sync queue, sending it on to the customer for review and approval. This functionality is highly valuable, as it can be done from anywhere, at any time. For those users using middle market accounting platforms that do not allow invoices to be "amended", it eliminates the need to void and re-create invoices. Alternatively, for users with lower end accounting platforms that allow invoices to be amended, the user could add detail to their invoice from within their accounting system, re-syncing it with the UPM for delivery to their customer. Additionally, the UPM-enabled system also has the ability, during the sync process, to ignore extraneous fields, only transmitting into the buyer's accounting system the relevant fields. Additionally, all fields can be delivered to the buyer, while only relevant or required can be presented to users for review, or automatically integrated within the buyer's accounting platform.

Figure 10:
Figure 11:
Figure 12:
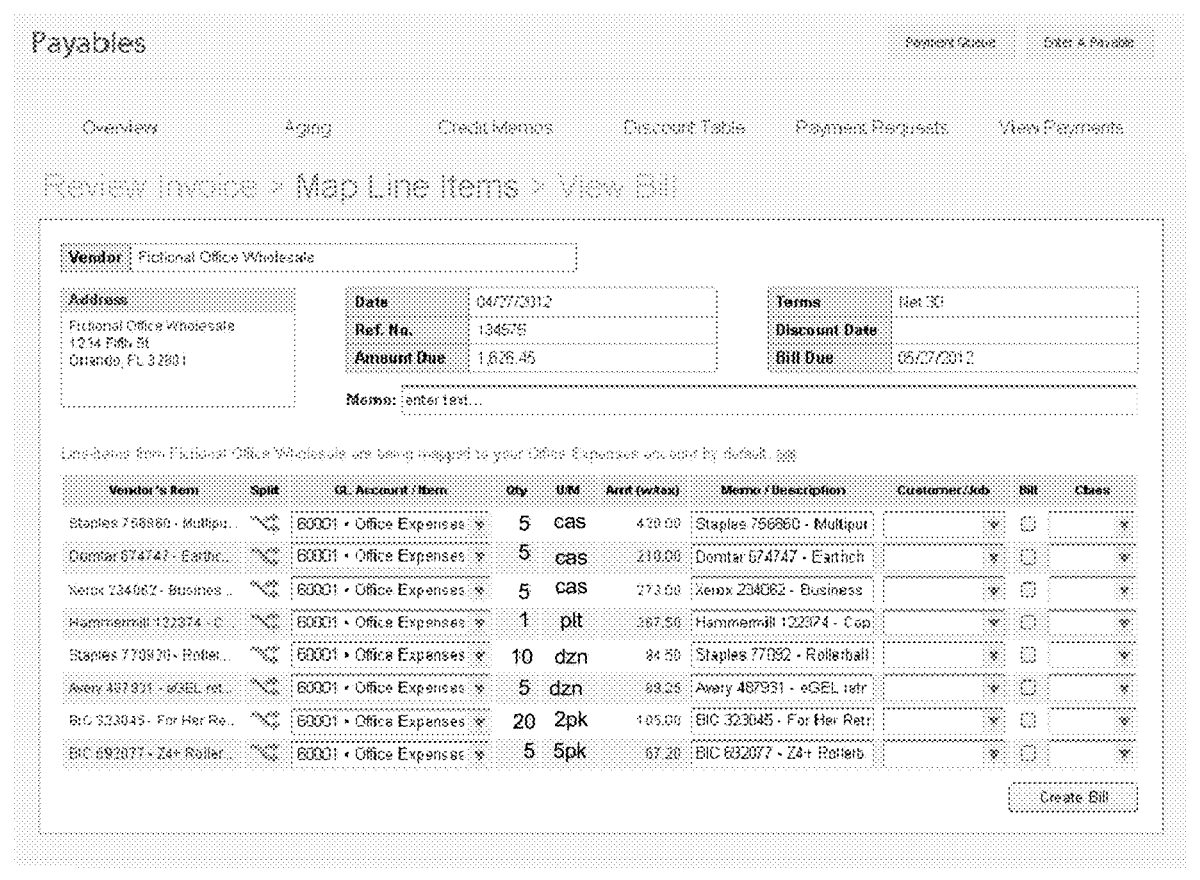
Figure 13:
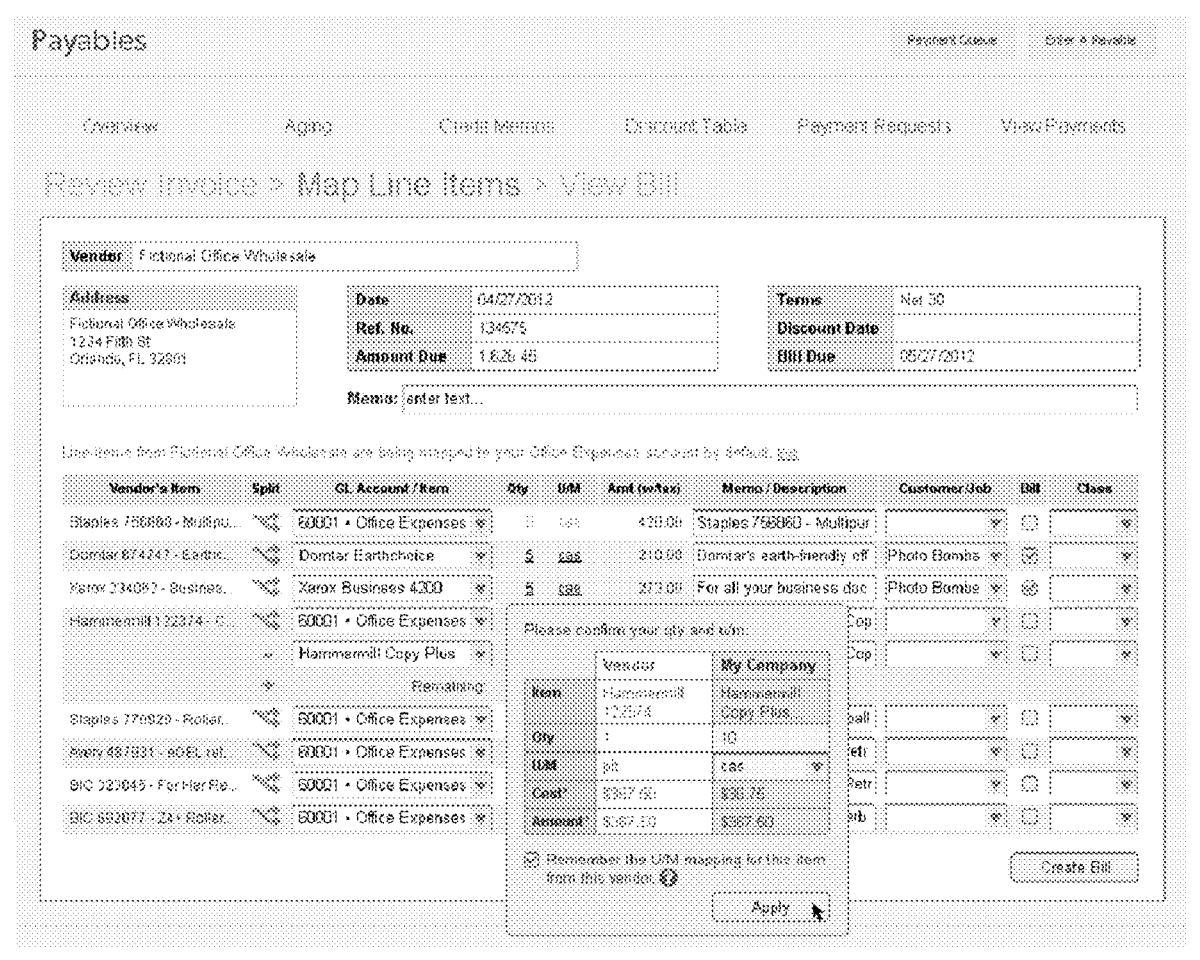

As a further example, a buyer can provide the UPM-enabled system will rules on how an invoice from a vendor can be automatically transformed into a bill for the buyer. FIGS. 10-16 are screenshots of a user interface in accordance with an illustrative implementation and illustrate mapping an invoice to a bill. FIG. 10 illustrates an invoice 1000 from a vendor. The invoice 1000 contains various information such as the invoiced items, costs for the items, quantity of items, and a total balance due. A buyer can see this invoice 1000 from within the UPM-enabled system and can approve items in the invoice 1000. FIG. 11 illustrates approving all the items in the invoice 1000. If an item was disputed, the UPM-enabled system can facilitate the dispute process, which is described in greater detail below. Buyers can view the invoice 1000 through the UPM-enabled system, but can also generate a bill from the invoice 1000. FIG. 12 illustrates a bill that is generated from the invoice 1000. Buyers can create rules that convert or map invoice data, which is provided from the vendor, into bill data, which is in a format useful for the buyer. For example, the buyer can create a default general ledger (GL) account code that is associated with a particular vendor. The default GL account code can then be associated with each invoice item. The buyer can also create a different GL account code mapping for particular invoice items. FIG. 13 illustrates various invoice items mapped to various GL account codes. The UPM-enabled system can remember these mappings and on future invoices automatically assign invoice items to the appropriate GL code.

Figure 14:
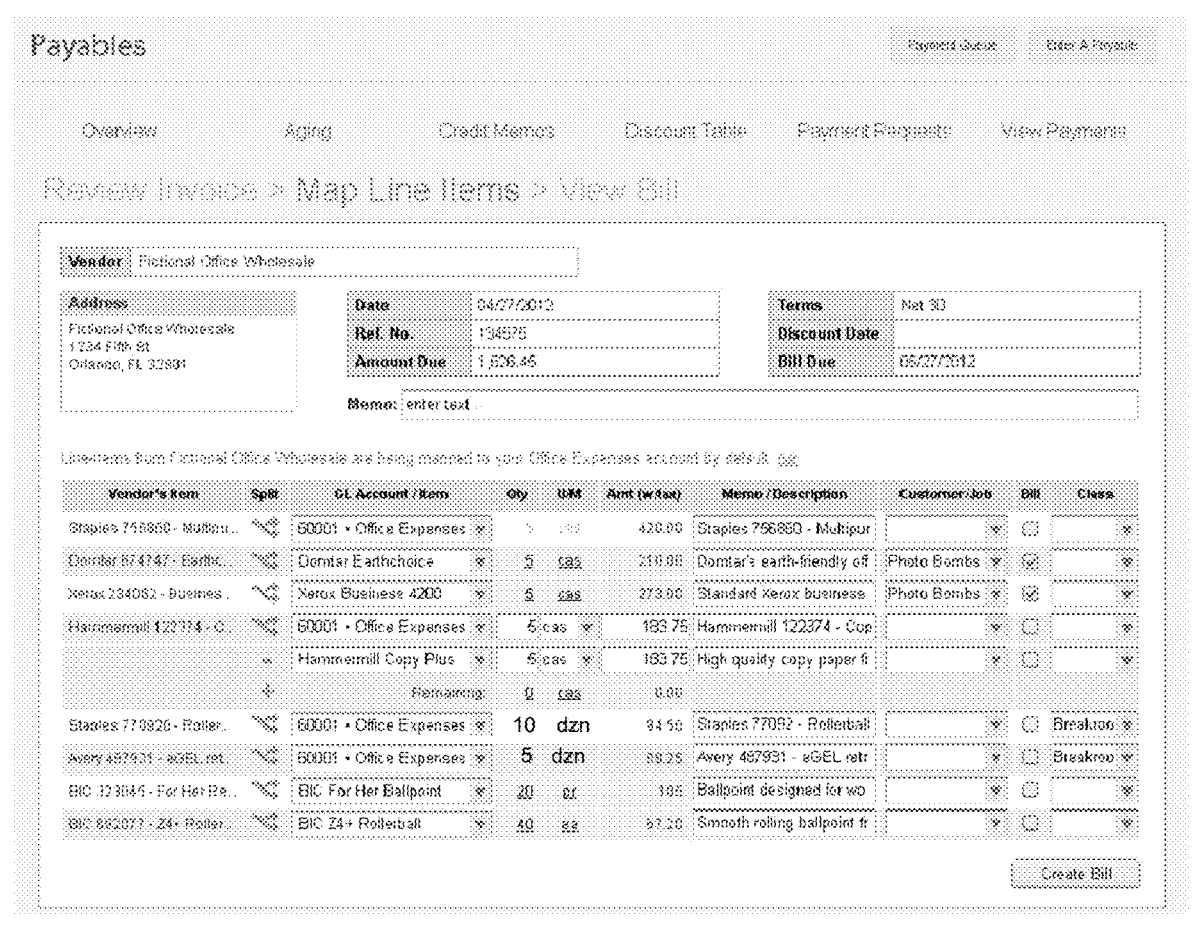

FIG. 13 also illustrates converting a vendor-supplied quantity into a buyer quantity. In the illustrated example, the vendor has invoiced one pallet of Hammermill® paper, which contains ten cases of paper. The buyer can indicate that the one pallet of paper should be treated as ten cases instead of a single pallet. This conversion can be saved and automatically applied to future invoices from the vendor. FIG. 14 illustrates a bill with ten cases of paper rather a single pallet of paper. The ten cases can be divided in various ways. For example, in the example bill, the cases are split into two bill items, each representing five cases. The two bill items can be treated independently from one another. For example, the two bill items can have different GL account codes, descriptions, classes, etc.

Figure 15:
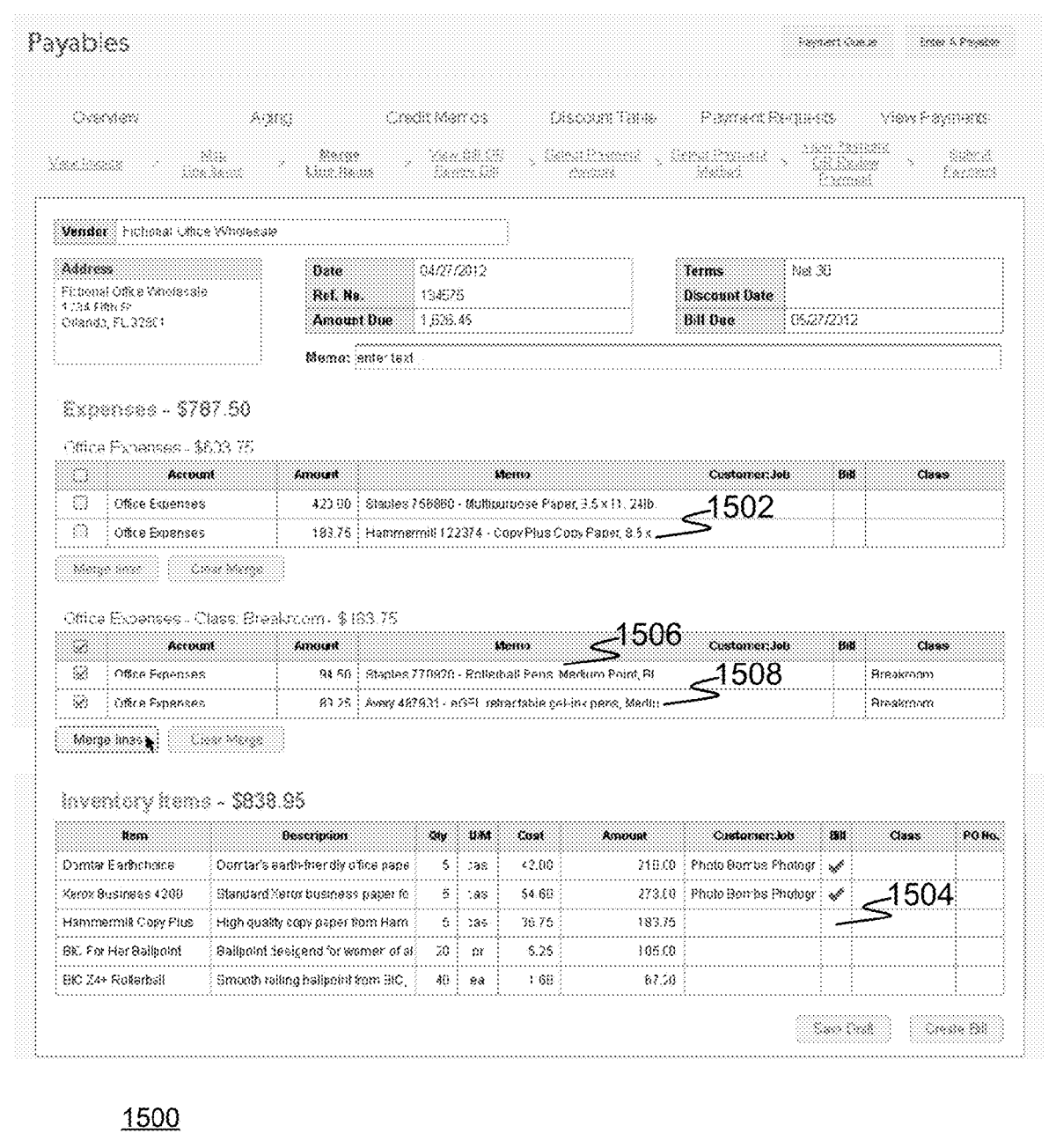
Figure 16:
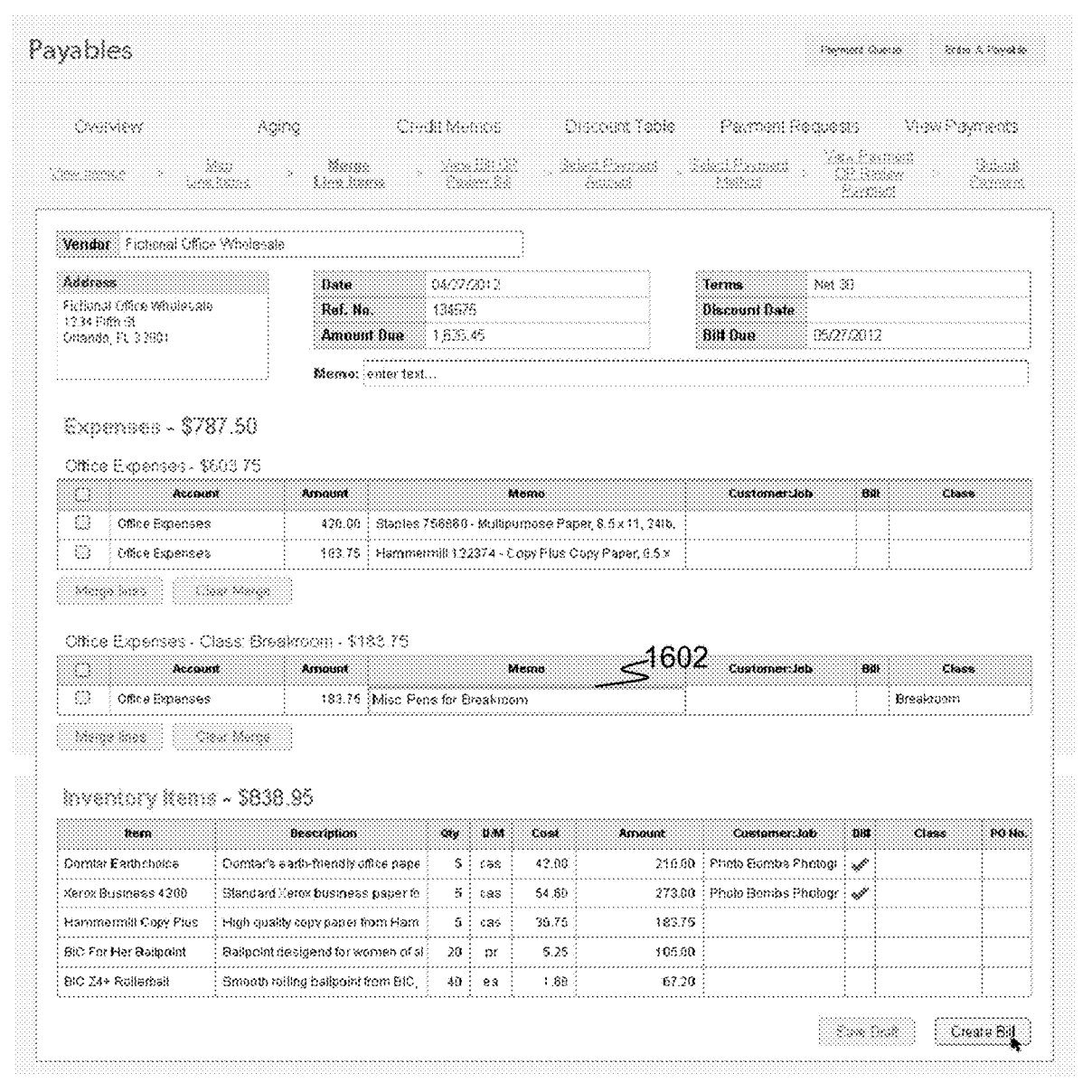

Based upon the various mapping/conversion rules, a bill can be generated. The UPM can generate a bill based upon rules provided by the buyer. For example, the buyer can indicate the fields that should appear on the bill. FIG. 15 illustrates an example of a draft bill 1500 based upon the invoice 1000. As can be seen in the draft bill 1500, the ten cases of paper that were split are shown differently. Five cases are shown as an expense item 1502 and five cases are shown as an inventory item 1504. In addition to splitting items, the UPM allows invoice items to be merged based upon the buyer's preference. For example, expense items 1506 and 1508 can be merged together since both items are expense items related to pens associated with the break room. To merge the items 1506 and 1508, the items are selected and the merge lines button is selected. FIG. 16 illustrates the merged expense items 1602. Once the buyer is satisfied, a bill can be generated from the draft bill 1500 by selecting the create bill button. If the buyer has their own accounting system, the bill can be synchronized into the buyer's accounting system as described above.

Figure 3:
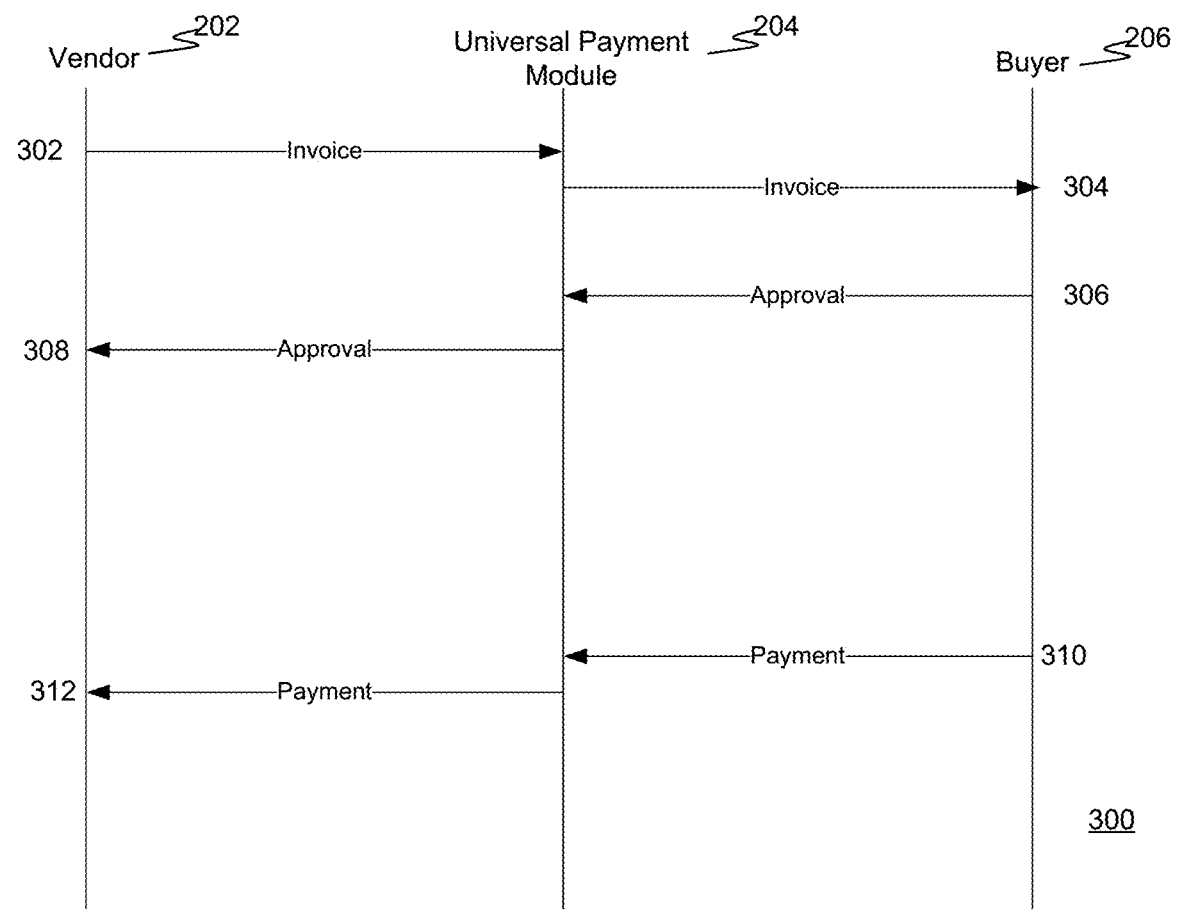
FIG. 3 is a timing diagram of paying an invoice using a universal payment module in accordance with an illustrative implementation.

The UPM-enabled system can also facilitate payment of invoices. FIG. 3 is a timing diagram 300 of paying an invoice using a universal payment module in accordance with an illustrative implementation. The timing diagram 300 illustrates operations performed in the payment process. Additional, fewer, or different operations may be performed, depending on the embodiment. The order of the operations may also be different, depending on the particular implementation. In the timing diagram 300, both a vendor 202 and a buyer 206 have previously registered with the UPM 204 and have connected with one another through invitation. The vendor 202 can create an invoice (operation 302), for example by entering a new invoice into an existing accounting system. Once synchronized, the UPM 204 contains data associated with the invoice, which is presented to the customer for review. If the customer is a very large business with an existing complex work flow approval process, the data from the vendor's invoice can simply flow through the UPM 204 into their existing work flow management process. In one implementation, the invoice is sent based upon synchronizing the invoice data. For example, the vendor 202 can enter the invoice into the vendor's accounting system and indicate that the invoice is to be sent to the buyer 206 by selecting a transmit button that can be added to the vendor's accounting system. Still, in another implementation, once invoices are entered into the vendor's accounting system, the sync can be triggered, or occur automatically, and the invoice will automatically be reflected in the buyer's screen with the UPM-enabled system. In another implementation, the UPM 204 does not send the invoice to the buyer 206 upon synchronization. Rather, the vendor 202 can, at a time after synchronization, use the UPM 204 to send the invoice to the buyer 206.

The buyer 206 can then approve the invoice on the UPM 204 (operation 306). Upon approval, the vendor is immediately notified, and the invoices, within the vendor's screens on the UPM-enabled system will reflect the approved invoice status. In another implementation, the buyer can sync invoice prior to approval, approving same within their existing accounting system. To the extent that their system can capture the invoice status, the same will be reflected within the UPM-enabled system upon sync. In another implementation the customer can create rules, using the UPM's workflow engine and rules engine, to approve invoices in an automated fashion. After approval, the approval notification can be sent to the vendor 202 (operation 308). At a later time, the buyer 206 can pay the invoice. In one implementation, payment of the invoice can be accomplished using a written check. Information about the payment, e.g., date of mailing, check number, amount, etc., can be sent to the UPM-enabled system (operation 310) automatically, through the sync process. This data is then available to the vendor 202 (operation 312).

In another implementation, the buyer 206 can pay the vendor 202 directly using account information of both the buyer 206 and vendor 202 contained within the UPM-enabled system. In this implementation, the buyer 206 can request that one or more invoices be paid in full or partially out of an account associated with the buyer 206. The buyer 206, however, is not required to know any account information of the vendor 202. Instead, the UPM 204 has the account information of the vendor 202 needed to complete the electronic payment. The UPM can determine the accounts based upon data provided by the buyer and vendor. For example, a buyer can indicate a default account from which invoices are to be paid and a vendor can indicate a default account to receive payment. Of course, the buyer and/or vendor can change these accounts for particular invoices, customers, etc. Once the account information of the buyer and vendor are known, the UPM-enabled system can facilitate the payment in various ways.

In one implementation, electronic payment can be achieved using ICLs, e.g., a Check 21 compliant process. The UPM-enabled system can determine the accounts associated with paying an invoice. If the UPM-enabled system has an agreement with the vendor's financial institution that allows ICLs, the UPM can create an ICL transaction based upon the one or more invoices to be paid. In this implementation, a buyer is provided with information regarding the payment of invoices. The buyer can select an account to pay the invoices and create a check, including by affixing their signature and telling the UPM-enabled system to pay the one or more invoices, e.g., by clicking on a pay button. In one implementation, the signature is affixed by the UPM-enabled system after receiving the buyer's instructions to affix their signature. The buyer, therefore, is determining the amount of the payment, the vendor, and the date of payment. The check can then be sent to the UPM-enabled system or the UPM-enabled system can be instructed to create the check. In one implementation, the UPM-enabled system can dynamically present an image of the check for the buyer to review, including affixing the buyer's signature, as requested by the buyer. The check can include language indicating that the check is in all respects a legally binding check in compliance with the UCC. In one implementation, the UPM-enabled system can then print and image the check. In another implementation the check is not printed. Once the UPM-enabled system receives the buyer's check, the UPM-enabled system can deliver the check, according to the vendor's instructions, via ICL. The UPM-enabled system, through its network of financial institution relationships, can then create an image cash file for submission to the vendor's financial institution. This image cash file can include deposits for numerous vendors of the financial institution. Within the image cash file will be an image cash letter unique to the payments made by the customers of the vendor. Through the ICL process, a payment can flow from the buyer through the UPM-enabled system directly to the vendor's account in as little as minutes.

In one implementation, the image cash file can be uploaded periodically and results in the initiation of transfer of funds between the buyer and the vendor. In another implementation, the file can be sent to the banking institution immediately after the file is generated. Vendors, therefore, receive their payments electronically within minutes or hours instead of days, without the need of paper checks, which must still be deposited to their financial institution prior to accessing the funds. In addition, the vendor's confidential financial account information is protected since it is never disclosed to the buyer 206. In one implementation, the UPM 204 can be accessed via mobile devices. Accordingly, the buyer 206 can interact with the UPM 204 through a mobile device and initiate payment through a single click via a mobile device.

Before an ICL payment can be made directly from a buyer to a vendor, there must be an agreement with the vendor's financial institution that allows the UPM-enabled system to deliver a buyer's check to the vendor. Using the vendor's financial account information, the UPM-enabled system can determine if a buyer to vendor ICL payment is possible. If such a direct ICL payment is not possible, the UPM-enabled system can still facilitate the payment in an efficient manner. For example, in one implementation, the UPM-enabled system can make two transactions, an ICL and an ACH, that reduces the amount of time for funds to be received compared to a traditional ACH payment from a buyer to a vendor. The UPM-enabled system can first use an ICL transaction into an account associated with the UPM-enabled system at the vendor's financial institution. The account associated with the UPM-enabled system is not the vendor account, but rather an account that, based upon an agreement the financial institution, can make ICL deposits. The ICL transaction includes the buyer's check being delivered to the vendor via the account associated with the UPM-enabled system. The buyer's payment is deposited into the UPM account, for the benefit of the vendor, and is then transferred to the vendor's account via ACH. In one implementation, the UPM-enabled system can initiate the ACH transfer after the ICL has cleared. Alternatively, the UPM-enabled system may not wait for payment to clear before initiating an outbound ACH to the vendor's account. Because the UPM-associated account and the vendor's account are with the same financial institution, the ACH payment can be handled more quickly than an ACH payment between two different financial institutions.

If the UPM-enabled system does not have an associated account at the vendor's financial institution, the UPM can use a two-transaction process still to deliver the funds to the vendor. In this implementation, the UPM-enabled system can initiate an ICL payment from the buyer's account to an account associated with the UPM-enabled system at a financial institution other than the vendor's financial institution. Once the buyer's funds have been cleared, the UPM-enabled system can initiate an ACH payment to the vendor's account.

In some implementations, the UPM 204 can verify the deposits. For example, a banking institution can provide data concerning the deposits sent by the UPM 204. Exemplary data includes the total number of deposits made, the total amount deposited, etc. The UPM 204 can compare its data with the data from the banking institution for any discrepancies.

In further embodiments, when the vendor financial account cannot receive or is not approved to receive ICL payments directly, two set of instructions may delivered from the UPS to a custodian financial intuition (CFI). The first set of instructions are payments in the form of the ICL payment(s). These instructions facilitate payment from the registered buyer who has approved payment in the universal payment system to the CFI. Monies from these payments are deposited into custodian ICL transfer account at the CFI that is owned and controlled by the CFI.

The second set of instructions from the UPS to the CFI contain the vendor financial account data for the registered vendor to whom the registered buyer has approved payment.

In a Step 3 the CFI makes payment from the custodian account to the vendors financial account at the vendors financial institution. In one scenario the custodian financial institution determines when to issue the payment instructions from the custodian account to the vendors financial account. In embodiments, the payment may be made immediately. In embodiments, the payment may be made periodically in a batch payment with multiple payments to other vendors at that financial institution. In embodiments, timing for the payments may be determined by the custodian financial institution based on one or more parameters.

The CFI uses the data supplied in both sets of instructions received from the UPS to compose the payment commands. Instruction set 1 contains information on the register buyer and the payment amount. Instruction set 2 contains the financial account information for the registered vendor. In embodiments, the payment may be by ACH payment.

In the flow above the CFI determines when to transfer the funds from the custodian account to the vendor. In embodiments, the universal payment system may provide to the custodian financial institution historical payment data for the one vendor over a period of time, e.g., payment due dates and actual payment dates made by the one buyer in the last month, or 6 months, or year, to name a few, to allow the custodian financial institution to make a payment timing determination. In embodiments, the universal payment system may compute a "confidence factor" (CF) in the $2^{nd}$ set of instructions. This confidence factor or confidence payment data may be used by the CFI to determine when to release the funds to the buyer financial institution. For example, if the buyer is a Fortune 1000 company that always makes payment on time and has a history of making payment without issue, the confidence factor may be 0.91 (scale of 0.00-0.99). The CF for a company who is making payment from the UPS for the first time may be 0.09. In embodiments, some buyer parameters that may be taken into account comprise buyer location, buyer size, buyer industry, time of the month, to name a few.

Figure 17:
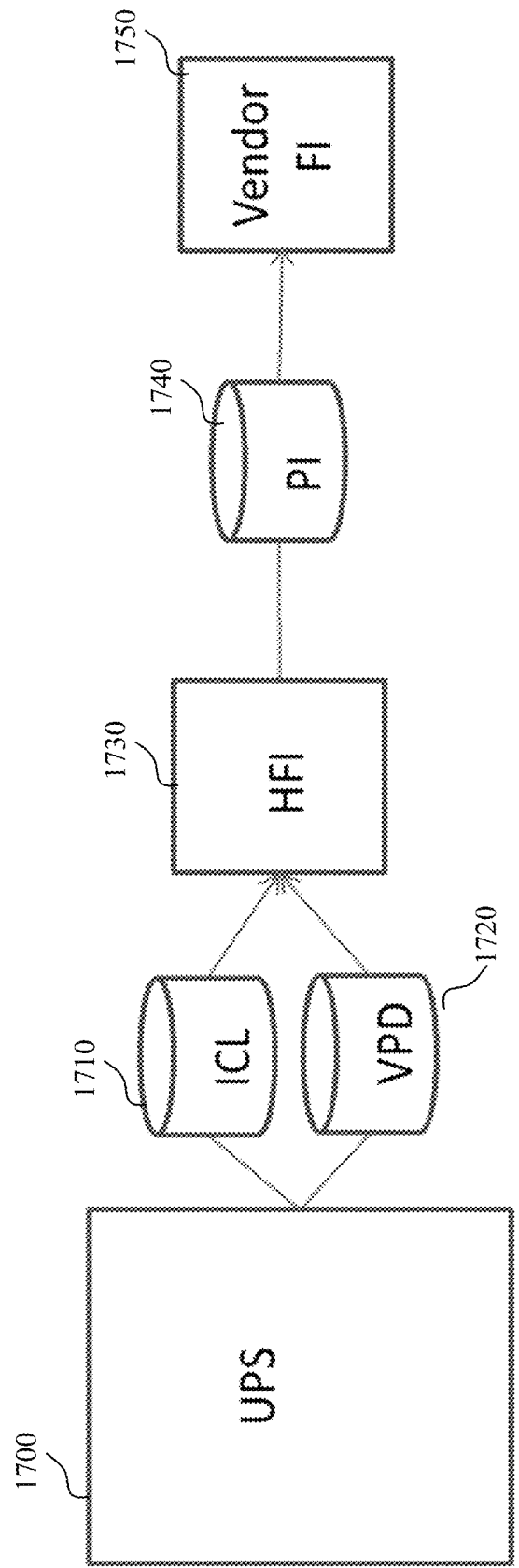
FIG. 17 is a schematic flowchart of a further embodiment of the invention.

In embodiments, this operation is illustrated by FIG. 17. Block 1700 represents the universal payment system. Block 1710 represents the generation of the first set of instructions for payment in the form of image cash letters. Block 1720 represents the generation of the second instruction for transfer from the custodian financial institution to the buyers financial institution. Block 1730 represents the custodian financial institution. Block 1740 represents the generation of the payment transfer instructions to transfer funds from the custodian financial institution to the vendor account in the vendor financial institution. Block 1750 represents the vendor financial institution.

In embodiments, there may be multiple custodian financial institutions throughout the country and/or the world. A selecting step may be performed to select one of the custodian financial institutions for the buyer credit based on one or more parameters. For example, one parameter may be that the vendor financial institution is also one of the custodian financial institutions. Another parameter may be location, e.g., country, or region within a country, or time zone. Another parameter may be time of day. Anther parameter may be affiliation. For example, it may be preferred to use a custodian financial institution that is affiliated with the vendor financial institution or with the buyer financial institution. Historical credit data or other account related data may be available from these affiliated institutions that may be used in determining the confidence factor.

In embodiments where the vendor financial institution cannot receive ICL's for the vendor financial account, the original check from the buyer may be made out to the universal payment system as payee, or to the vendor financial account as payee, or to the custodian ICL transfer account as payee. In embodiments, the universal payment system may then generate an ICL with the custodian ICL transfer account as payee.

In embodiments, instructions may be provided to receive, at the universal payment system, a request from one of the buyers to send an approved payment amount on behalf of the one buyer to one of the vendors;

to access, by the one or more processors via the data repository, a buyer financial institution and a buyer financial account for the one buyer;

to access, by the one or more processors via the data repository, a vendor financial institution and a vendor financial account for the one vendor;

to generate, by the one or more processors, an image of a check drawn on the one buyer account based at least in part on the request from the one buyer and listing the approved payment amount and affixing a signature of the one buyer to the check, or receiving, by the one or more processors, an image of a check with a signature from the one buyer drawn on the one buyer account;

to determine, by the one or more processors accessing the data repository, an ability of the vendor financial institution to receive or not to receive ICLs from the universal payment system for the vendor financial account of the one vendor;

to determine, by the one or more processors, based on a determination that the vendor financial institution for the one vendor cannot receive the ICL for the vendor financial account of the one vendor, whether the custodian financial institution from the network of financial institutions is the vendor financial institution of the one vendor;

to create, by the one or more processors, when it has been determined that the vendor financial institution does not have the ability to receive an ICL payment directly for the vendor financial account, at the universal payment system, an ICL based in part on the check, wherein the image cash letter includes the buyer account, the buyer financial institution, the custodian ICL transfer account owned and controlled by the custodian financial institution, and the approved payment amount;

to generate, by the one or more processors, when it has been determined that the vendor financial institution does not have the ability to receive an ICL payment directly for the vendor financial account, two sets of instructions: a first set of instructions comprising an image cash letter payment from the buyer account of the one buyer to the custodian ICL transfer account held by the custodian financial institution; and a second set of instructions that contain data for the vendor financial institution and the vendor financial account for the one vendor for which payment was approved so that a payment can be made from the custodian financial institution to the vendor financial account;

to send, by the one or more processors, when it has been determined that the vendor financial institution does not have the ability to receive an ICL payment directly for the vendor financial account and the vendor financial institution is the custodian financial institution, from the universal payment system, the ICL created to the custodian financial institution to transfer the approved payment amount from the buyer account at the buyer financial institution into the custodian ICL transfer account therein for subsequent transfer to the buyer financial account;

instructions to send, by the one or more processors, from the universal payment system, the ICL created to the custodian financial institution, when it has been determined that the vendor financial institution does not have the ability to receive an ICL payment directly for the vendor financial account and when the custodian financial institution is not the vendor financial institution, to transfer the approved payment amount from the buyer account at the buyer financial institution into the custodian ICL transfer account therein for subsequent transfer to the buyer financial institution; and instructions to generate an ICL with the vendor financial account as payee, by the one or more processors, when it has been determined that the vendor account has the ability to receive an ICL payment directly, and initiate an electronic transfer of the ICL with the vendor financial account as payee, from the universal payment system directly to the vendor financial account at the vendor financial institution.

Figure 4:
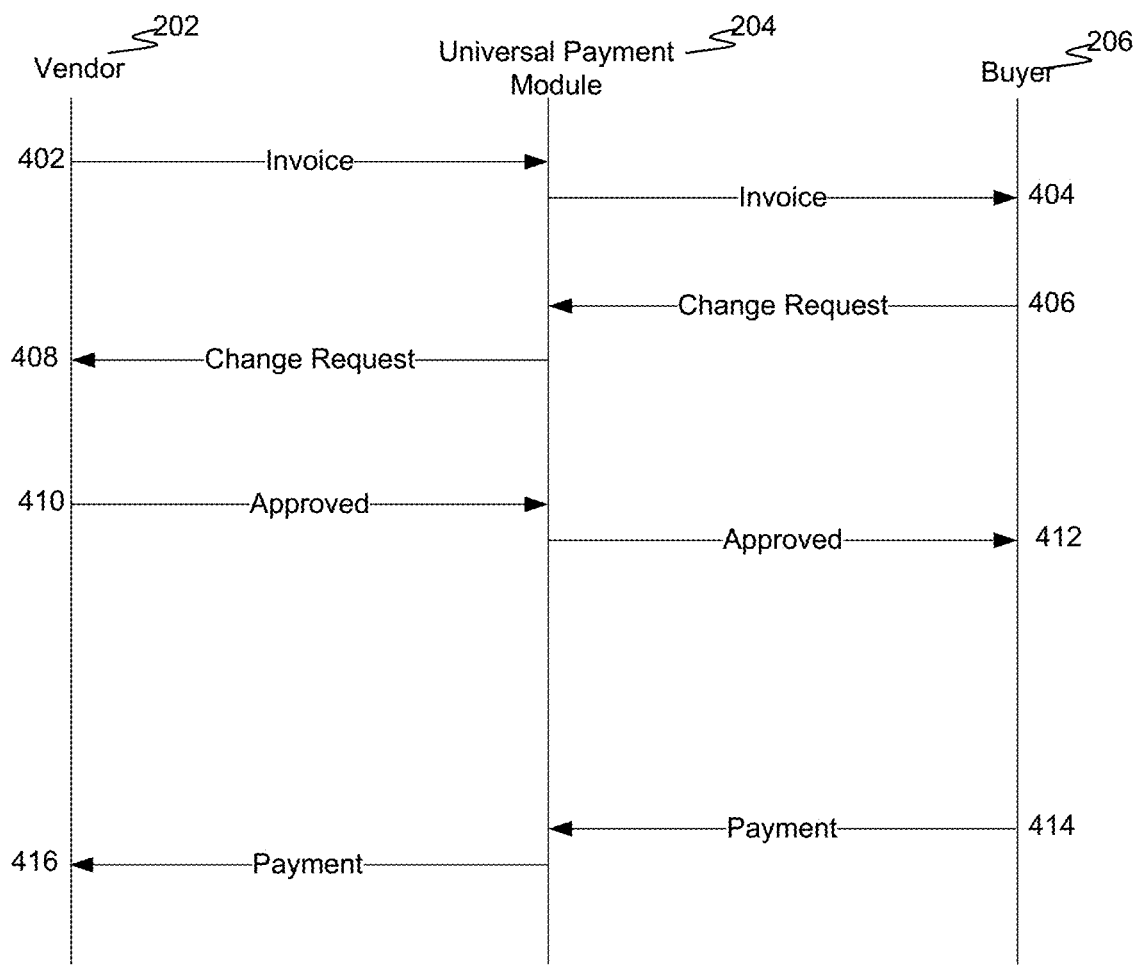
FIG. 4 is a timing diagram of a change request using a universal payment module in accordance with an illustrative implementation.

At any time during the invoicing process, the buyer 206 or vendor 202 can determine the status of the invoice by simply querying the UPM-enabled system. In either case, the status of the invoice can be determined without requiring a call to the other party. In addition to being able to determine a status of an invoice efficiently, the UPM 204 allows for efficient changes to invoices. FIG. 4 is a timing diagram of a change request process using a universal payment module in accordance with an illustrative implementation. Additional, fewer, or different operations in the process may be performed, depending on the embodiment. The order of the operations may also be different, depending on the particular implementation.

Similar to FIG. 3, an invoice is sent by the vendor 202 to the buyer 206 through the UPM 204 in the UPM-enabled system (operations 402 and 404). The buyer 206, however, notices a mistake or wishes to change the invoice in some way. Instead making a phone call or emailing the vendor, which may necessitate the vendor voiding the invoice and sending a new invoice, the buyer 206 can request a change to the invoice by sending the requested change to the UPM 204 (operation 406). For example, the buyer 206 can make a change to invoice data displayed through the interface of the UPM 204. The requested change can then be sent to the vendor. Alternatively, the vendor 202 can request a change to an invoice. Upon receipt of the change request (operation 408), the vendor 202 can send an approval of the change back to the UPM 204 (operation 410). If the vendor 202 did not approve the change, an indication of the rejection can be sent back to the buyer 206 through the UPM 204. At this point, the buyer can ignore the rejection and simply pay the amount they believe is correct or pay the originally invoiced amount. Upon receipt of the approval of the requested change (operation 412), the buyer 206 can pay the updated invoice (operations 414 and 416) in a similar way as described above in regard to FIG. 3's payment of the invoice. Based upon changes to invoices, the UPM-enabled system can determine if a credit memo should issue and be extended to the buyer 206 as described in detail above.

Early Payment of Invoices

Buyers sometimes have the ability to pay invoices before their due dates and vendors sometimes would like or be willing to be paid prior to the due date of their invoices. To entice buyers to do this, vendors can offer a discount on the invoice if the invoice is paid early. Due to the time needed to negotiate terms, vendors have adopted set rules that apply generally across most if not all of their invoices. For example, 2% 10 net 30 is a common set of terms where a buyer can take a 2% discount on an invoice if paid within 10 days. If the invoice is not paid within 10 days, the total amount is due within 30 days. These terms are not negotiated on an invoice-specific basis for most invoices as the amount of time and resources needed to agree to terms would not be justified by the savings. Accordingly, known agreements, such as 2% 10 net 30, are used.

The UPM-enabled system, however, allows for efficient early payments that are not bound by generally acceptable terms. In one implementation, a buyer can request that a vendor accept early payment for a particular discount, on a particular invoice, or a group of invoices, through the UPM-enabled system. The vendor can then review all request for early payment within the UPM 204 and accept early payment from one or more requests. In another implementation, companies, in their capacity as buyers, can create discount graphs that describe the discounts they are willing to take for early payments of an invoice to a vendor, or accept for early payment from a customer. Discount graphs can be based upon any formula, curve, etc.

These discount graphs can be unique to a particular buyer/vendor, a particular invoice, invoices of certain amounts, etc. The discount graphs can be used by the UPM 204 to automatically accept early payment requests through matching the request for early payment with the appropriate discount graph. That is to say, if a vendor has indicated, through the creation of a discount preference, a willingness to accept early payment for a fee of 2%, and a buyer of the vendor has indicated a willingness to pay early for a fee of 2%, the UPM-enabled system can automatically accept and notify the buyer of the vendor's acceptance. Automatic acceptance of the request can be controlled through preferences in the UPM-enabled system. For example, a request that matches the appropriate discount graph can be indicated as matching but require the vendor's explicit approval before accepting. In another implementation, the UPM-enabled system can automatically accept the request for particular buyers/vendors, for invoices whose amounts are below a particular amount, etc. In another implementation, the vendor need only indicate through, or to, the UPM-enabled system the total funds needed and the UPM automatically notifies the buyer that a match has been made and can be accepted through the act of payment. In one implementation, the payment can occur in the simplest implementation through the act of selecting the pay button. The act of selecting the pay button serves as acknowledgement by the buyer that it wishes to create and affix its signature to an electronic check, drawn upon its designated account and payable to the vendor through the UPM-enabled system. Additional examples of discount graphs and the use of discount graphs for both buyers and vendors are described in greater detail below.

In another implementation, the vendor can indicate a need for a specific dollar amount and if no matches to their discount preferences were able to be made automatically, the UPM-enabled system can present to the vendor the most proximate matches to their preferences, allowing the vendor to request early payment from the next most acceptable buyer offer. In yet another implementation the vendor can indicate their willingness to accept early payment from the buyer if the fee was adjusted to an alternative amount. The buyer would then have the ability to accept the alternative offer, accepting through the act of payment, or begin a negotiation cycle. All negotiation cycles ending based either on timetables established by either the buyer or vendor or upon payment by the buyer.

Figure 5A:
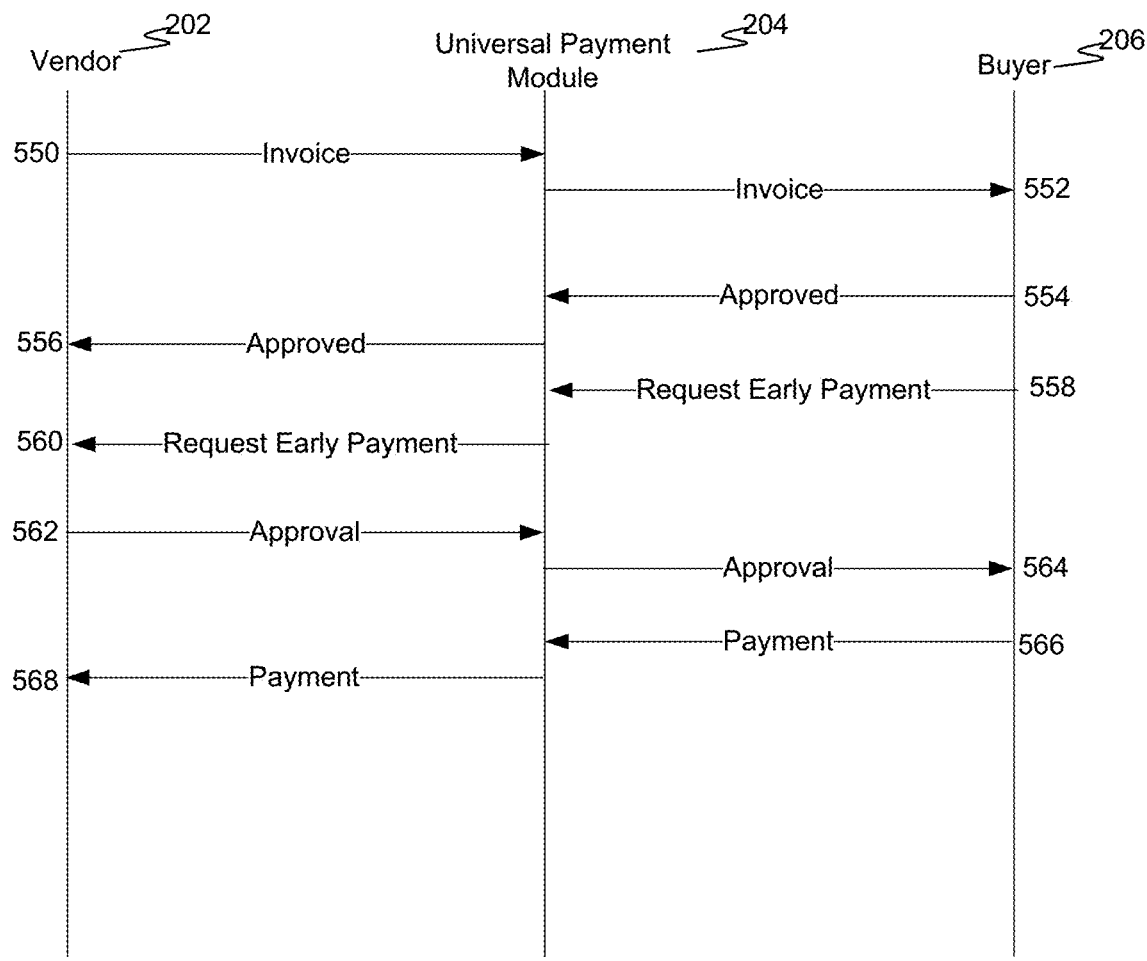
FIGS. 5A-5B are timing diagrams of requesting early payment of an invoice in accordance with an illustrative implementation.

The UPM-enabled system can enable a buyer to pay invoices early, with little to no friction or inefficiency. FIG. 5A is a timing diagram of requesting early payment process of an invoice in accordance with an illustrative implementation. Additional, fewer, or different operations in the process may be performed, depending on the embodiment. The order of the operations may also be different, depending on the particular implementation. Similar to FIG. 3, an invoice is sent by the vendor 202 to the buyer 206 through the UPM 204 (operations 550 and 552). The buyer approves (operation 554) the invoice and an indication of this approval is sent to the vendor (operation 556) and visible through the UPM. At some point, the buyer 204 decides that they are willing to pay one or more invoices from the vendor 202 prior to the one or more invoices' respective due dates. The buyer 206 can send a notification of its willingness to pay early, at a corresponding fee to the vendor 202, through the UPM (operations 558 and 560). The vendor 202 can then accept the early payment request by sending a request for early payment to the buyer through the UPM 204 (operations 562 and 564). The invoice can then be paid (operations 566 and 564) in a similar way as described above in regard to FIG. 3's payment of the invoice. For example, if accepted by the vendor, the UPM-enabled system can notify the buyer and the buyer can make payment via electronic check via the UPM from anywhere, at any time, with the click of a button. For example, as describe in greater detail throughout, payment can be made by a one click payment or a multi-click payment workflow with varying levels of checks and balances.

As another example, the buyer 206 can communicate on the UPM-enabled system its willingness to pay an invoice early, if within 5 days of the invoice date, for a 3% discount or a 1.5% discount if paid after 5 days of the invoice but prior to its due date. The amount of the discount seen by the vendor 202 can be automatically updated based upon the age of the invoice. For example, the discount in the above example would automatically be reduced from 3% to 1.5% if the vendor 202 did not accept the early payment request within the 5 day timeframe. The vendor 202 can accept the early payment request by sending a request for early payment to the buyer through the UPM 204, and the invoice can then be paid in a similar way as described above in regard to FIG. 3's payment of the invoice.

The vendor 202 can also approve the buyer's early payment request but require that the buyer 206 pay the invoice within a specified time period. For example, the vendor's approval can be valid for a period of time, e.g., 24 hours, 48 hours, etc, in which the buyer must send payment. If the buyer 206 does not send payment in that period of time, the vendor's approval can be automatically revoked by the UPM 204. The UPM 204 can notify the buyer 206 that the vendor's approval is no longer valid.

In one implementation, the vendor can tell the UPM-enabled system to accept early payment requests based upon approval criteria. For example, the vendor can indicate that all early payment requests from particular buyers less than a certain amount with discounts below an identifiable threshold should be accepted. In addition, the vendor can limit the automatic acceptance of early payments by limiting the total amount which can be accepted within any given period of time. In one implementation, a vendor can have the UPM-enabled system automatically pay an accepted early payment request based upon the approval criteria.

The UPM 204 can also allow buyers to offer unique and customizable early payments options to its vendors, which through the UPM can be visible on an invoice-specific basis to all vendors. These terms can be unique to a vendor, a purchase order, an invoice, or a category of vendors, and can be tied to any metric designed by the buyer. For instance, the buyer may establish a linear daily declining discount rate, from 3% at 30 days early to 0% on the due date. Further, the buyer may establish a floor rate, not less than 1.25% of the invoice amount. Still differently, the buyer may establish fees based on buckets of time (invoices paid 25-30 days early are associated with a discount of x, and 20-24 days early are associated with y discount). Still, differently, buyers may establish terms that are offered to unique classes of vendors (minority- and women-owned businesses).

As to the vendor, given that the UPM-enabled system includes connections to a network and vendors can see all customer relationships in one location, vendors can manage their access to capital in a truly unique way, as they will always be able to see the least expensive terms available, and can select those terms. That is, the vendor can see offers from various buyers willing pay invoices early and the discount they are requesting. A vendor can then request early payment of the invoices, in the amount they need, at the time they need for a fee that they are willing to accept, all, having been optimized by competition across their buyers. Since the early payment of invoices creates a new source of capital/liquidity for vendors, and the need and importance of capital/liquidity can differ at different times (missing payroll for lack of liquidity may be considered a bigger problem than not being able to pay certain bills on time) the vendor can be provided many early payment options. For instance, the vendor may opt to request, via the UPM-enabled system, early payment in the amount needed for the lowest possible discount. Alternatively as described in greater detail below, the vendor may opt to select early payment from the vendors with the greatest likelihood of fulfilling their payment request on time, the UPM serving as the analytics engine to evaluate, rate and predict customer performance. Still alternatively, the vendor may select to extend early payment requests to the buyers (a combination of buyers may be required to fulfill the total amount needed by the vendor) that are able to fulfill the vendor's request, at the lowest possible discount. Still further, the vendor, in need of liquidity with a great deal of certainty, but not wanting to pay higher discounts unnecessarily, could use the capability within the UPM-enabled system to extend addition requests to successive buyers, or to invoices within buyers, who are offering higher rates, but only after providing a window of time for the initial request, on lower priced invoices, to pass. For instance, if buyer one was offering to pay invoice 123 with a value of $5,000 for a discount of 1%, and invoice 1234 with a value of $3,000 for 3%, and buyer two was offering to pay invoice 321 with a value of $1000 for a discount of 1.5%, and invoice 3214 with a value of $6,000 for a discount 2.5%, the vendor could ask the UPM-enabled system to optimize, using a user friendly interface, for cost and speed while finding $6,000 for the vendor, with a further request increment of 20 minutes. In this circumstance an early payment request would immediately be placed (either automatically, or presented to the vendor for approval) on invoice 123 from buyer 1 and invoice 321 from buyer 2. If 20 minutes expired, and neither buyer 1 nor buyer 2 fulfilled the request, a further request would be extended to invoice 3214 from buyer 2 (which carries a higher rate). If buyer 2 fulfilled the request, all other requests would immediately be terminated, the buyers being notified that another buyer had fulfilled the request. In another implementation if no other buyer had fulfilled their request, and buyer 2 attempted to pay both outstanding requests, totaling $7,000, buyer 2 would be notified that the vendor had limited the total funds payable early to $6,000. Further, if another buyer fulfilled the $5,000 request, the $6,000 invoice could be automatically deselected by the UPM. Still another option is for the UPM-enabled system to extend early payment requests, in potential satisfaction of the vendor's request, to multiple buyers simultaneously, in an amount that in aggregate will exceed the funds needed. However, in this first-to-fund scenario, the request will be immediately withdrawn as soon as any one, or series of buyers in aggregate, fulfills the amount identified as being needed by the vendor.

Figure 5B:
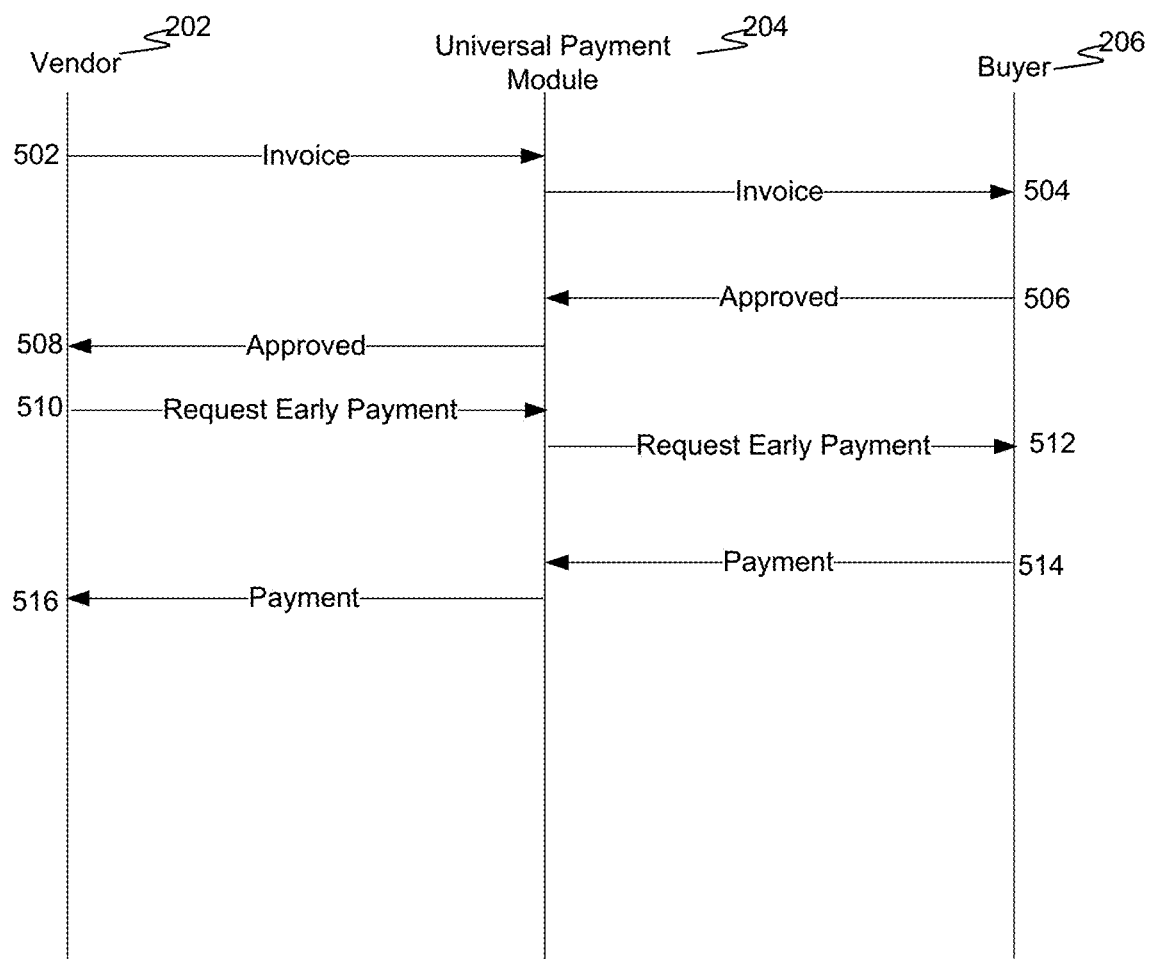

Just as a buyer can notify vendors of their willingness to pay invoices early for a discount, vendors can notify buyers of their willingness to accept early payment for a discount. FIG. 5B is a timing diagram of requesting early payment of an invoice in accordance with an illustrative implementation. Additional, fewer, or different operations in the process may be performed, depending on the embodiment. The order of the operations may also be different, depending on the particular implementation. Similar to FIG. 3, an invoice is sent by the vendor 202 to the buyer 206 through the UPM 204 (operations 502 and 504). The buyer approves (operation 506) the invoice and an indication of this approval is sent to the vendor (operation 508). At some point, the vendor 202 decides that they would like to receive payment of one or more invoices from the buyer 206. The vendor 202 can send a request for early payment to the UPM 204 (operation 510). This request can be sent to the buyer 206 (operation 512). To entice the buyer 206 to make an early payment, the vendor 202 can give the buyer 206 a discount on any invoices paid early. For example, the vendor can give the buyer 206 a 3% discount if they pay within 5 days of the invoice or a 1.5% discount anytime thereafter. The amount of the discount seen by the buyer can be automatically updated based upon the age of the invoice. For example, the discount in the above example would automatically be reduced from 3% to 1.5% if the buyer did not accept the early payment request within the 5 day timeframe. The buyer 206 can accept the early payment request by sending payment of the invoice. The invoice can be paid (operations 514 and 516) in a similar way as described above in regard to FIG. 3's payment of the invoice.

As another example of early payment requests, using the UPM-enabled system, a vendor/buyer can request early payment from a number of buyers/vendors. As an example, a vendor can have a business need to raise a certain amount of money, $4,500, in a particular time frame. As a vendor is likely to have outstanding invoices to a number of buyers, the vendor can raise any needed funds by requesting early payment of multiple invoices from multiple buyers or by accepting one or more requests to accept early payment from one or more buyers.

FIG. 6 illustrates a listing of invoices 600 that are available for early payment in accordance with an illustrative implementation. Continuing the example of a vendor wanting to raise $4,500, the listing of invoices 600 in FIG. 6 illustrates outstanding invoices for a particular vendor. The vendor may have additional outstanding invoices that are not eligible for early payment. Accordingly, these invoices are not shown in FIG. 6.

To raise $4,500, the vendor can request early payment for each of these invoices. Assuming that a number of buyers accept the early payment request, the vendor could raise more than the needed $4,500. The vendor may want to avoid early payment of invoices that would result in the receipt of funds greater than $4,500, avoiding an unneeded discount. For example, after raising the $4,500, the vendor may want to wait the term of the invoice to collect the entire amount of the invoice without a discount.

To minimize the amount of discounts taken by the vendor, the UPM-enabled system can determine an order to request early payments. For example, the UPM can generate a the sequence with which to request early payment in such a way as to minimize discount fees to the vendor. The UPM can determine this sequence based upon a number of factors. For example, the UPM can calculate the order of invoices based upon the best chance of the needed funds being paid within a timeframe. Prior to generating the listing 600, the vendor can provide a preference for certainty over cost. For example, following our current example, the vendor can indicate the $4,500 is needed immediately, with a very high level of certainty. Using this information, the UPM-enabled system can calculate a predication of a buyer's acceptance of a request for early payment. For example, using historical acceptance figures, the UPM can determine how likely a buyer is to accept an early payment request for an invoice on a given day. Historical data can include not only historical acceptance figures, but other historical accounting data. As an example, if a buyer processes payroll every two weeks, the buyer may be less likely to accept an early payment request during a payroll week. Other examples include other periodical payments such as taxes, rent, etc. Further, outstanding invoices of a buyer can be taken into consideration. If a buyer has to make a large payment based on other outstanding invoices, the buyer may be less likely to pay another invoice early. Using a combination of any of this data, and data available externally, like bank credit availability, access to funds from the customer's customers, in the customers capacity as a vendor, the UPM can calculate an acceptance prediction.

Using the acceptance prediction, the UPM-enabled system can determine an order in which to request early payment. For example, the UPM can calculate an ordered list based upon chance of acceptance. FIG. 7 illustrates such an ordered list 700 of invoices for early payment in accordance with an illustrative implementation. In this case, the invoices shown in FIG. 6 are grouped and ordered based upon the likelihood of acceptance of early payment. In the illustrated implementation, the chance of success is calculated as the simple probability of all early payment requests of invoices within a group being accepted based on historical behavior patterns. In other implementations, other probabilities can be used, e.g., weighted probability based upon invoice amount, reduction of probabilities based upon number of invoices, etc. Using the simple probability, the UPM-enabled system can calculate that the first group 702 consists of invoice 1010 (606). This invoice is the only invoice in the group as acceptance of this single invoice will raise the needed $4,500. In addition, the chance that this invoice is accepted for early payment is 61.3%. The next group 704 consists of invoices 1006 (602) and 1007 (604). These two invoices are next in the list since there is a 60.6% chance that both early payment requests associated with these invoices will be accepted. If both invoices are paid early, the needed $4,500 will be paid. Group 706 is next in the list and includes invoices 1007 (604) and 1001 (606). If invoice 1001 (606) and invoice 1007 (604) are both paid early the entire $4,500 will be raised. Using the acceptance predication value, the UPM can calculate that there is a 39.7% chance of acceptance of both. The list 700 does not include invoice 1002 (610). In one implementation, the invoice 1002 can be filtered out of the invoices based upon its low acceptance predication of 5.7%. In addition, if only full invoice amount are used, invoice 1002 can be filtered as it would take an unneeded discount, since no combination of invoices needs $99.00. In other words, another combination would raise the needed $4,500 and the $99.00 if paid early would result in an unnecessary 1% discount.

In another implementation, the list can be ordered based upon the discount. In this implementation the order of the list would be reversed. The order of the groups would be 706, 704, 702 based upon the calculated discount for the group. In yet another implementation, the list can be ordered based upon a combination of the discount and the acceptance rate. Further, the discount and the acceptance rate can be weighted prior to being combined.

Based upon an order listing, a vendor can request that the UPM-enabled system request early payment of the invoices in the order of the list 700. For example, if a vendor wanted to raise $4,500 but minimize the amount of discount given, the UPM-enabled system can request early payment of invoices 1007 and 1001 first. Then after a predetermined amount of time, early payment of invoice 1006 can be requested. Early request of payment for invoice 1007 would not be needed since it was already requested previously. The same or different amount of time can pass before the UPM requests early payment of invoice 1010. Staggering the requests for early payment based upon the ordered list 700 can increase the chance of raising the $4,500 for the minimum discount.

Optimizations of Early Payment of Invoices

In one implementation, a buyer can indicate that it will pay or will partially pay an invoice. In previous systems, partial pay was impractical as it required time to agree to terms and to record multiple entries into the accounting system. The UPM-enabled system eliminates or removes these inefficiencies by creating a frictionless transaction. Without the UPM-enabled system, early payment or partial payment of an invoice required an expensive check print process that includes human interaction to agreeing to terms, printing a check, mailing a check, updating an accounting system to note that an invoice was only partially paid and that the remaining balance was due at some other date. Partially paying an invoice duplicates some of these steps, e.g., agreeing to terms, printing and mailing a check, etc. Accordingly, parties typically do not partially pay invoices due to these inefficiencies. The UPM-enabled system, however, can remove these inefficiencies and given the seamless nature of the UPM, partial payment, in conjunction with accounting system integration through the UPM, can be made easily and efficiently. The UPM-enabled system, therefore, facilitates partial payments and allows buyers and vendors greater control and options of how invoices are paid. Accordingly, if a buyer is willing to partially pay an invoice, the UPM-enabled system can request only partial payment of an invoice. In this case, the UPM-enabled system could request a partial payment of $4,500 for invoice 1010 instead of the entire amount as shown in FIG. 6. This feature allows a vendor to raise only the amount of capital needed at a discount. Any unpaid remainder can be paid by the buyer at a later time with a smaller or no discount.

Using partial payment of invoices, in another implementation, multiple early payment requests may be sent to the buyer for the same invoice based upon discount rates. For example, using the invoice data in FIG. 6, if a vendor wanted to raise $3000 the vendor can first request early payment of invoice 1001 and also early payment of $1000 of invoice 1006. If after a certain period of time the requests for early payment have not been accepted, the UPM-enabled system can request that the entire amount of invoice 1006 and $1500 be paid from invoice 1007. After yet another period of time, if the needed funds have not been raised, the UPM-enabled system can request any needed funds from invoice 1007. For example, if no buyer accepted the request for early payment, the entire $3000 can be requested to be paid early from invoice 1007. Alternatively, if the buyer associated with invoice 1006 agree to pay the invoice early, the UPM-enabled system could request the needed $1530 from invoice 1007.

The ability to partially pay an invoice can change the order of a listing of early payment requests. For example, in group 604, invoice 1006 can be requested for early payment prior to invoice 1007 due to the discount rates. If early payment of invoice 1006 is accepted prior to requesting early payment of 1007, the vendor can request that $3,030 be paid toward 1007 instead of the full amount.

The UPM-enabled system can also expire requests for early payment. The UPM can automatically terminate any outstanding early payment requests once the needed amount has been accepted. For example, in the listing 600, if early payment has been requested on all invoices and if the early payment request for invoice 1010 was accepted, all other early payment requests can be terminated. Accordingly, buyers can have an incentive to quickly agree to any acceptable early payment requests, since the early payment request can be cancelled based upon another buyer accepting an early payment request from the vendor.

The UPM-enabled system can also allow conditional acceptance. For example, in the listing 600, payment of invoice 1007 with either invoice 1006 or 1001 would result in the needed $4,500. However, payment of invoices 1006 and 1001 together is not ideal since payment of invoice 1007 is still needed to reach the $4,500 goal. To avoid this, the UPM can make the acceptance of an early payment request conditional. For example, acceptance of early payment for invoice 1006 or 1001 can be conditional on the acceptance of invoice 1007.

Figure 8:
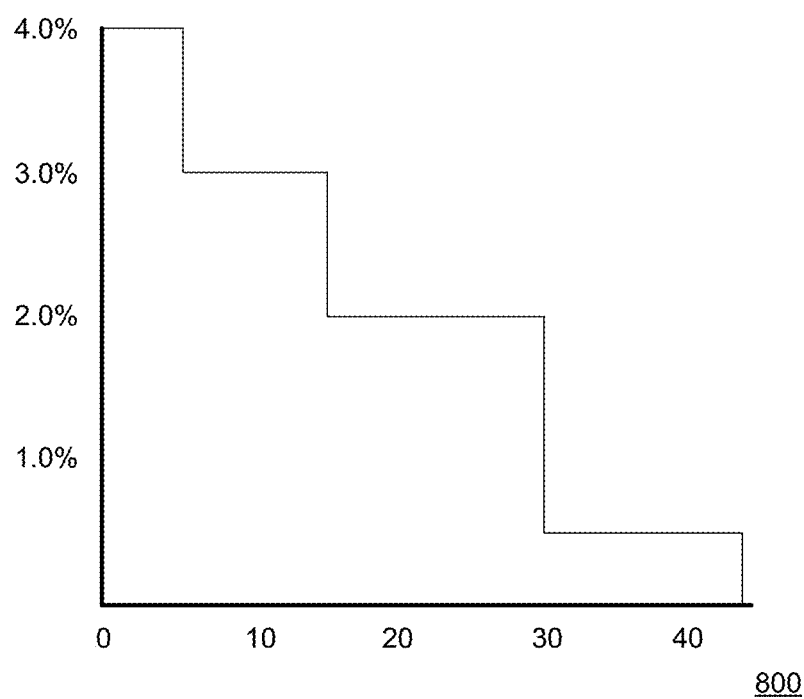
FIG. 8 illustrates a discount graph in accordance with an illustrative implementation.

FIG. 8 illustrates a discount graph 800 in accordance with an illustrative implementation. This graph 800 can be used to determine if the company is willing to accept an early payment request. That is, if a request for early payment matches the data in the graph 800, it can be assumed that the company will accept the early payment request. In one implementation, the company can have the UPM-enabled system automatically accept the request for early payment based upon the data in the graph 800. The graph can be associated with a company's buyers or vendors.

For example, the graph 800 can be associated with a buyer's vendors and indicate the discounted amount the buyer is willing to pay a vendor for early payment. In addition, the UPM-enabled system can use this table to automatically accept early payment requests for the buyer from a vendor, without requiring any additional user interaction. The graph 800 indicates that the company is willing to pay an early invoice within the first five days if the vendor is willing to give the company a 4.0% discount on the invoice. As the invoice ages, the discount the company is willing to charge is lowered. The graph 800 illustrated resembles a step graph. A discount graph, however, can be any curve, function, etc.

Alternatively, the graph 800 can be associated with a vendor's buyers and indicate the discounted amount the vendor will accept from a buyer for early payment. The UPM-enabled system can use this table automatically to accept requests for early payments from a buyer if the vendor has indicated that the UPM-enabled system can automatically accept requests for early payments. In addition, a vendor can set up different discount charts for different criteria. For example, a vendor can set up a less costly discount graph for preferred buyers. The amount of the invoice can also be used to determine the appropriate discount chart. A vendor may give a larger discount to invoices that are above a certain dollar value. The type of items on the invoice can also be used to determine the appropriate chart. If an invoice is for items with a large profit margin, the vendor can use a discount chart with higher discounts. Conversely, the vendor can use a discount chart with smaller discounts for invoices that have small profit margins. The UPM-enabled system can determine which chart is appropriate based upon the current invoice and use the correct chart. Once the correct chart has been selected, the chart can be used to determine if early payment should be accepted. Other criteria can also be used to determine if early payment should be accepted. For example, data can be used from the integration with the company's accounting systems, e.g., margins, vendor categories, future payouts, payables, etc.

Buyers can also use this data to create discount charts that indicate the discount they will accept for early payment. For example, if a buyer knows that a vendor has larger margins, the buyer can charge more to pay an invoice early. In some instances, two companies will be both buyers and vendors to one another. A different discount chart can be used for these instances. For example, a smaller than normal discount can be used to foster the existing business relationship. In this implementation, the UPM-enabled system can determine which chart is appropriate based upon the current invoice and use the correct chart. Once the correct chart has been selected, the chart can be used to determine if early payment should be accepted.

Early Payment of Invoices Marketplace

There are at least three different options for an early payment of invoices marketplace. First, finance players can register on the UPM-enabled system. The buyers are then able to enter into unsecured financing relationships with financing players whereby early payment requests from the vendors of the buyer, on approved invoices, are directed to the financing player who funds the early payment request to the vendor, using the credit line provided to the buyer. Simultaneously the UPM-enabled system can provide notification to the buyer that its early payment requests had been satisfied through a draw on its line of credit from the financing player. Further, the UPM-enabled system would allow the buyer to sync the transaction to its accounting platform, closing out the open payables to the vendor and creating a payable due to the financing player in the amount of the invoice due to the vendor, less a portion of the fee that the financing player, through the UPM-enabled system, or directly with the buyer, agreed to share with the buyer, due on the original date of the invoice from the vendor that was satisfied in full. In so doing, in a nearly frictionless electronic process, financing players can participate in attractive yields while buyers uninterested in paying early can still provide that service to their vendors, through financing players, and yet, experience no accounting inefficiency while sharing in the financial benefit of the program. By way of example, if a vendor requested invoice 1 (already approved by the buyer), in the amount of $100 to be paid at a 3% discount, and the financing party had agreed to share 30% of the saving with the buyer, the notification would be sent, through the UPM-enabled system, to the financing party, rather than the buyer. The financing party could then send electronic check payment, through the UPM-enabled system, from the unsecured credit line provided for the benefit of the buyer. In this example $97 would have been sent to the vendor in satisfaction of their invoice. In a near instant transaction the buyer would be notified that invoice number 1 had been paid in full, from a draw from their unsecured credit line provided by the financing party, and the accounting entries could be synced to their accounting system. In this case, the accounting entry would be payment in full of a $100 payable plus an amount due to financing party of $99, due on the identical date invoice 1 was originally due (although extending terms would be available at the discretion of the buyer and financing party) with $1 being allocated to program savings (income) or other identifiable general ledger category of the buyer's choosing.

Another marketplace option is for the UPM-enabled system to provide the above functionality directly, acting in a capacity as a financing party. Still, in another marketplace option, a buyer, who on its own may have otherwise been unable to offer early payment of an invoice, in their capacity as a vendor, through the UPM-enabled system, could dynamically evaluate the early payment offers from its buyers and deploy similar amounts to its vendors, for a stated spread. That is a company can be both a buyer and a vendor. The company can request that vendors pay one or more of the company's invoices early for a particular discount. The company can use some or all of the proceeds to pay one or more outstanding invoices of its vendors. Said differently, the UPM-enabled system can enable a buyer (in its capacity as a vendor) to indicate the spread it would like to earn over the early payment requests available to it from its customers, deploying similar early payment offers to its vendors, for same spread. This can be done in an automatic fashion, just as the acceptance and payment of requests can be done in an automatic fashion.

Mobile Payments

As another example, the UPM-enabled system can enable mobile payments. For example, a user can have a mobile computing device that contains data associated with the user's UPM account. This information can be presented on the mobile computing device, for example, through a bar code or a QR code. A merchant can scan the presented account information and send the account information along with an amount that is to be paid to the mobile device. The merchant can send the information in an invoice or the UPM-enabled system can create an invoice from the information received from the merchant. This invoice can then be associated with the user's UPM account. The user can then approve and authorize payment of the invoice through the UPM-enabled system or on their mobile device connected to the UPM, or through their mobile device's app, which is connected to the UPM. For example, if a user was in a retail store, at checkout upon completion of scanning the items to be purchased the merchant could scan the bar code or QR Code on the user's mobile device. Upon scanning, the merchant point of sale system can communicate the unique user identification to the UPM-enabled system, along with the final receipt amount, and the UPM can then present the receipt on the user's mobile device. The user can then have the option of tapping the approve and pay button. Tapping the approve and pay button can have the effect of communicating to the UPM-enabled system that the user had approved the purchase and had authorized an electronic check in the amount of the receipt to the merchant, concluding the transaction. In another implementation, the merchant could implement an affinity program through the UPM, applying savings at the time of checkout, or alternatively, applying the transaction proceeds to an affinity account. The UPM can then, using processes described above, deliver the electronic check to the account of the merchant, along with reconciling information back to the original receipt. In yet another implementation, for example when the user is paying in a restaurant or a service provider, the user could see the receipt on their phone and would have the option of adding a tip to the total bill. In yet another implementation, in the event the user identified an error the user could reject the receipt and the merchant could re-transmit a corrected receipt. In another implementation the user could select the specific account they wanted to pay from, should they choose to pay from an account other than their default account. In yet another implementation the UPM-enabled system could provide, offered through third parties, or directly, guarantee services, ensuring the merchant of cleared funds.

Peer-to-Peer Payments

The UPM-enabled system can also allow individuals to make/receive payments from other individuals. A UPM user can request that a payment be made to any other UPM user. For example, a first user can use the UPM-enabled system to select a quantity of money to be transferred out of an account associated with the first user. The first user can then request that the UPM-enabled system transfer the money to a second user. The first user, however, can identify the second user by name, UPM login, cell phone number, etc., without having to know the second user's financial account information. Once the second user has been selected, the first user can authorize the UPM-enabled system, e.g., via selecting a pay button, to transfer the quantity of funds. The UPM-enabled system can then facilitate the transfer of the quantity of funds as described above in regard to UPM payments.

Figure 9:
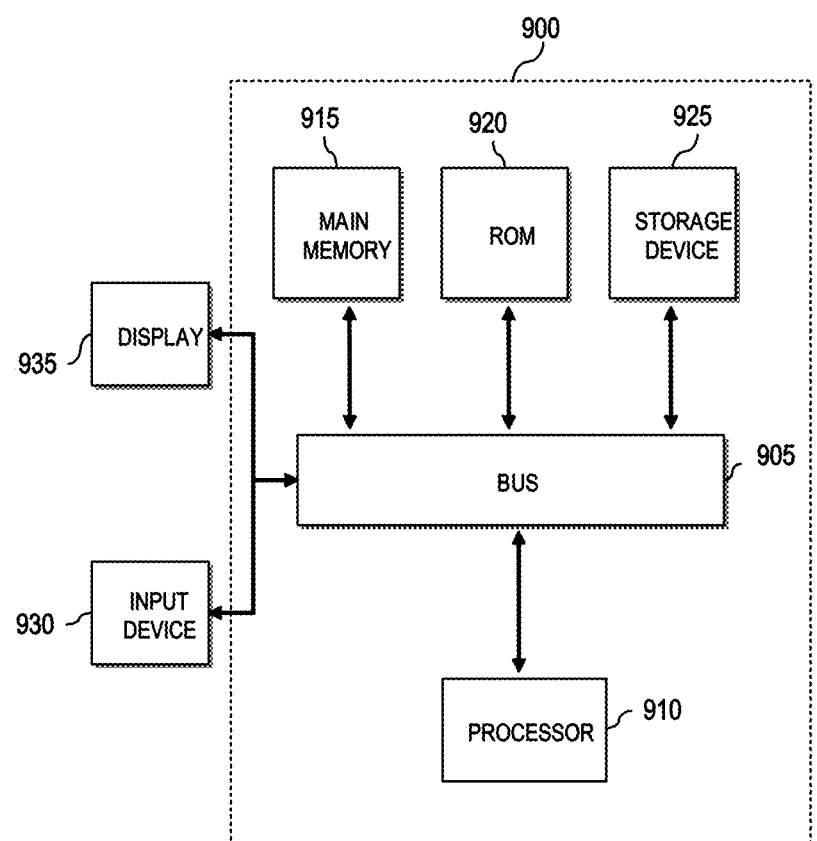
FIG. 9 is a block diagram of a computer system in accordance with an illustrative implementation.

FIG. 9 is a block diagram of a computer system in accordance with an illustrative implementation. The computer system or computing device 900 can be used to implement the UPM. The computing system 900 includes a bus 905 or other communication component for communicating information and a processor 910 or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read only memory (ROM) 910 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information and command selections to the processor 910. In another implementation, the input device 930 has a touch screen display 935. The input device 930 can include a cursor control, such as a mouse, a trackball, or cursor direction keys, for communicating direction information and command selections to the processor 910 and for controlling cursor movement on the display 935.

According to various implementations, the processes described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Although features may be described above as acting in certain combinations and even initially claimed as such, one or more features from a claimed combination can in some cases be excised from the combination, and the claimed combination may be directed to a subcombination or variation of a subcombination. In addition, the actions recited in the claims and various described implementations may be performed in a different order and still achieve desirable results.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

What is claimed is:

1. A non-transitory computer-readable medium having instructions stored thereon, when executed by one or more processors of a universal credit system (UCS) computer, cause the one or more processors to perform a method comprising:

accessing a data repository comprising:
data for a respective vendor financial account and identification data for a respective vendor financial institution for each of a first plurality of vendors that are registered with the universal credit system, including data on a respective ability of each of multiple of the vendor financial institutions to receive or not to receive for respective vendor financial accounts of the respective vendors image cash letter (ICL) credits directly from the universal credit system computer;
data for a respective buyer financial account and identification data for a respective buyer financial institution for each of a first plurality of buyers that are registered with the universal credit system; and
network transfer data for a network of the vendor financial institutions;

receiving a request from one of the buyers to send an approved credit amount on behalf of the one buyer to one of the vendors;

accessing via the data repository, data on the buyer financial institution and the buyer financial account for the one buyer;

accessing via the data repository, data on the vendor financial institution and the vendor financial account for the one vendor;

generating an image of a check drawn on the one buyer account based at least in part on the request from the one buyer and listing the approved credit amount and affixing a signature of the one buyer to the check, or receiving an image of a check with the signature from the one buyer drawn on the one buyer account;

determining the ability of the vendor financial institution of the one vendor to receive or not to receive ICL credits from the universal credit system for the vendor financial account of the one vendor;

when it has been determined that the vendor financial institution of the one vendor does not have the ability to receive an ICL credit directly for the vendor financial account of the one vendor, selecting one of from among a plurality of custodian financial institutions based on one or more parameters, each custodian financial institution holding a custodian ICL transfer account associated with the UCS computer;

when it has been determined that the vendor financial institution of the one vendor does not have the ability to receive an ICL credit directly for the vendor financial account of the one vendor, creating an ICL based in part on the check, wherein the ICL includes the buyer account, the buyer financial institution, the custodian ICL transfer account selected associated with the UCS computer, and the approved credit amount;

creating an image cash file including the ICL;

uploading the image cash file periodically to the vendor financial institution;

processing payment to the vendor financial institution using the ICL;

when the vendor financial institution does not have the ability to receive an ICL credit directly for the vendor financial account of the one vendor and this vendor financial institution does not hold the custodian ICL transfer account selected associated with the UCS computer, sending electronically the image cash letter with an image cash letter credit based at least in part on the buyer account of the one buyer to the custodian ICL transfer account selected in another of the vendor financial institutions, with instructions to initiate an electronic transfer of the credit from the custodian ICL transfer account selected to the vendor financial account in the vendor financial institution for the one vendor;

when it has been determined that the vendor financial institution does not have the ability to receive an ICL credit for the vendor financial account and the vendor financial institution does hold the custodian ICL transfer account selected associated with the UCS computer, sending electronically the image cash letter with the image cash letter credit based at least in part on the buyer account of the one buyer to the custodian ICL transfer account selected in the vendor financial institution of the one vendor, with instructions to initiate an electronic transfer of the credit electronically from the custodian ICL transfer account selected to the vendor financial account for the one vendor;

creating an ICL for the vendor financial account of the one vendor to receive the credit from the buyer account, when it has been determined that the vendor account of the one vendor has the ability to receive an ICL credit directly, and initiating an electronic transfer of the ICL from the universal credit system directly to the vendor financial account at the vendor financial institution;

receiving, via synchronization with respective buyer accounting systems or via a web interface of the universal credit system, electronic notification of payment information comprising dates associated with payments for a plurality of invoices;

indicating in a synchronization queue, that data changes are available to be synchronized into an accounting system of a respective buyer;

integrating the data changes indicated as available into the accounting system of the respective buyer when the respective buyer approves the synchronization or turns on auto synchronizing capabilities;

computing a hash of invoice amount fields in new data;

comparing the computed hash with a hash of invoice amount fields in data of the accounting system of the respective buyer;

determining, based on a result of the comparison, whether there is a conflict in values of the invoice amount fields between the new data and data of the accounting system of the buyer;

in response to determination that there is a conflict, resolving the conflict in the values of the invoice amount fields between the new data and the data of the accounting system of the buyer and determine resolved values of the invoice amount fields;

integrating the new data into the accounting system of the respective buyer such that integrated data include both the resolved values of the invoice amount fields and values of fields other than the invoice amount fields;

determining whether the check is printed wherein:
if it is determined that the check is printed creating the ICL using the printed check; and
if it is determined that the check is not printed, including the ICL in the image cash file.

2. The non-transitory computer-readable medium as defined in claim 1, the method further comprising:
generating a confidence factor to indicate that the one buyer will make the credit on time, based at least in part on credit history of the one buyer; and
sending the confidence factor for the one buyer to the vendor financial institution for determining when to transfer funds from the custodian ICL transfer account held therein to the vendor financial institution.

3. The non-transitory computer-readable medium as defined in claim 1, wherein the one or more of the parameters are selected from the group of location, time of day, time zone, and affiliation.

4. The non-transitory computer-readable medium as defined in claim 1, wherein the image cash letter includes a plurality of checks associated with a plurality of the buyers and a plurality of the vendors.

5. The non-transitory computer-readable medium as defined in claim 1, wherein the electronic transfer of funds from a respective custodian ICL transfer account to the vendor account at the one vendor financial institution is accomplished by an automated clearing house (ACH) transfer.

6. The non-transitory computer-readable medium as defined in claim 1, the method further comprising making accessible, from the universal credit system, notification of credit, to the one vendor.

7. The non-transitory computer-readable medium as defined in claim 1, wherein the one or more of the parameters comprises an affiliation between the custodian financial institution and one or more of the vendor financial institution and the buyer financial institution.

8. A computer-implemented universal credit system (UCS) comprising:
one or more processors, configured to execute instructions comprising:
accessing a data repository, the data repository comprising:
data for a respective vendor financial account and identification data for a respective vendor financial institution for each of a first plurality of vendors that are registered with the universal credit system, including data on a respective ability of each of multiple of the vendor financial institutions to receive or not to receive for respective vendor financial accounts of the respective vendors image cash letter (ICL) credits directly from the universal credit system computer;
data for a respective buyer financial account and identification data for a respective buyer financial institution for each of a first plurality of buyers that are registered with the universal credit system; and
network transfer data for a network of the vendor financial institutions;

receiving a request from one of the buyers to send an approved credit amount on behalf of the one buyer to one of the vendors;
accessing via the data repository, data on the buyer financial institution and the buyer financial account for the one buyer;
accessing via the data repository, data on the vendor financial institution and the vendor financial account for the one vendor;
generating an image of a check drawn on the one buyer account based at least in part on the request from the one buyer and listing the approved credit amount and affixing a signature of the one buyer to the check, or receiving, by the one or more processors, an image of a check with the signature from the one buyer drawn on the one buyer account;
determining the ability of the vendor financial institution of the one vendor to receive or not to receive ICL credits from the universal credit system for the vendor financial account of the one vendor;
when it has been determined that the vendor financial institution of the one vendor does not have the ability to receive an ICL credit directly for the vendor financial account of the one vendor, selecting one of from among a plurality of custodian financial institutions based on one or more parameters, each custodian financial institution holding a custodian ICL transfer account associated with the UCS computer;
when it has been determined that the vendor financial institution of the one vendor does not have the ability to receive an ICL credit directly for the vendor financial account of the one vendor, creating an ICL based in part on the check, wherein the ICL includes the buyer account, the buyer financial institution, the custodian ICL transfer account selected associated with the UCS computer, and the approved credit amount;
creating an image cash file including the ICL;
uploading the image cash file periodically to the vendor financial institution;
processing payment to the vendor financial institution using the ICL;
when the vendor financial institution does not have the ability to receive an ICL credit directly for the vendor financial account of the one vendor and this vendor financial institution does not hold the custodian ICL transfer account selected associated with the UCS computer, sending the image cash letter with an image cash letter credit based at least in part on the buyer account of the one buyer to the custodian ICL transfer account selected in another of the vendor financial institutions, with instructions to initiate an electronic transfer of the credit from the custodian ICL transfer account selected to the vendor financial account in the vendor financial institution for the one vendor;
when it has been determined that the vendor financial institution does not have the ability to receive an ICL credit for the vendor financial account and the vendor financial institution does hold the custodian ICL transfer account selected associated with the UCS computer, sending electronically the image cash letter with the image cash letter credit based at least in part on the buyer account of the one buyer to the custodian ICL transfer account selected in the vendor financial institution of the one vendor, with instructions to initiate an electronic transfer of the credit electronically from the custodian ICL transfer account selected to the vendor financial account for the one vendor;

creating an ICL for the vendor financial account of the one vendor to receive the credit from the buyer account, when it has been determined that the vendor account of the one vendor has the ability to receive an ICL credit directly, and to initiate an electronic transfer of the ICL from the universal credit system directly to the vendor financial account at the vendor financial institution;

receiving via synchronization with respective buyer accounting systems or via a web interface of the universal credit system, electronic notification of payment information comprising dates associated with payments for a plurality of invoices;

indicating in a synchronization queue, that data changes are available to be synchronized into an accounting system of a respective buyer;

integrating the data changes indicated as available into the accounting system of the respective buyer when the respective buyer approves the synchronization or turns on auto synchronizing capabilities;

computing a hash of invoice amount fields in new data;

comparing the computed hash with a hash of invoice amount fields in data of the accounting system of the respective buyer;

determining based on a result of the comparison, whether there is a conflict in values of the invoice amount fields between the new data and data of the accounting system of the buyer;

in response to determination that there is a conflict, resolving the conflict in the values of the invoice amount fields between the new data and the data of the accounting system of the buyer and determine resolved values of the invoice amount fields;

integrating the new data into the accounting system of the respective buyer such that integrated data include both the resolved values of the invoice amount fields and values of fields other than invoice amount fields;

determining whether the check is printed wherein:
if it is determined that the check is printed, creating the ICL using the printed check; and
if it is determined that the check is not printed, including the ICL in the image cash file.

9. The system as defined in claim 8, wherein the one or more processors are further configured to:
generate a confidence factor to indicate that the one buyer will make the credit on time, based at least in part on credit history of the one buyer; and
send the confidence factor for the one buyer to the custodian financial institution for determining when to transfer funds from the custodian ICL transfer account held therein to the vendor financial institution.

10. The system as defined in claim 8, wherein the one or more of the parameters are selected from the group of location, time of day, time zone, and affiliation.

11. The system as defined in claim 8, wherein the image cash letter includes a plurality of checks associated with a plurality of the buyers and a plurality of the vendors.

12. The system as defined in claim 8, wherein the electronic transfer of funds from a respective custodian ICL transfer account to the vendor account at the one vendor financial institution is accomplished by an automated clearing house (ACH) transfer.

13. The system as defined in claim 8, further comprising instructions to make accessible, from the universal credit system, notification of credit, to the one vendor.

14. The system as defined in claim 8, wherein the one or more of the parameters comprises an affiliation between the custodian financial institution and one or more of the vendor financial institution and the buyer financial institution.

* * * * *